(12) United States Patent
Xie et al.

(10) Patent No.: US 9,064,301 B2
(45) Date of Patent: Jun. 23, 2015

(54) METHOD AND APPARATUS FOR COMPRESSING IMAGING DATA OF WHOLE BLOOD SAMPLE ANALYSES

(75) Inventors: Min Xie, Plainsboro, NJ (US); Zhizhou Wang, Princeton, NJ (US)

(73) Assignee: Abbott Point of Care, Inc., Princeton, NJ (US)

( * ) Notice: Subject to any disclaimer, the term of this patent is extended or adjusted under 35 U.S.C. 154(b) by 961 days.

(21) Appl. No.: 13/087,037

(22) Filed: Apr. 14, 2011

(65) Prior Publication Data

US 2012/0263369 A1 Oct. 18, 2012

(51) Int. Cl.
| | |
|---|---|
| G06K 9/00 | (2006.01) |
| G06T 7/00 | (2006.01) |
| H04N 19/102 | (2014.01) |
| H04N 19/167 | (2014.01) |
| H04N 19/17 | (2014.01) |

(52) U.S. Cl.
CPC ........ *G06T 7/0012* (2013.01); *H04N 19/00012* (2013.01); *H04N 19/00248* (2013.01); *H04N 19/0026* (2013.01); *G06T 2207/10024* (2013.01); *G06T 2207/10056* (2013.01); *G06T 2207/10064* (2013.01); *G06T 2207/30024* (2013.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 6,252,979 B1 * | 6/2001 | Lee et al. | | 382/133 |
| 7,062,088 B1 * | 6/2006 | Clauson | | 382/166 |
| 8,218,883 B2 * | 7/2012 | Ohkubo et al. | | 382/232 |
| 8,345,991 B2 * | 1/2013 | Gering et al. | | 382/232 |
| 8,350,905 B2 * | 1/2013 | Yamada | | 348/80 |
| 8,406,539 B2 * | 3/2013 | Gering et al. | | 382/232 |
| 2002/0037100 A1 * | 3/2002 | Toda et al. | | 382/166 |
| 2002/0090140 A1 * | 7/2002 | Thirsk | | 382/239 |
| 2005/0180645 A1 * | 8/2005 | Hasegawa et al. | | 382/239 |
| 2006/0250604 A1 * | 11/2006 | Hamada et al. | | 356/39 |
| 2008/0019584 A1 * | 1/2008 | Lindberg et al. | | 382/134 |
| 2010/0054575 A1 * | 3/2010 | Zhou et al. | | 382/134 |
| 2011/0122242 A1 * | 5/2011 | Garud et al. | | 348/79 |

OTHER PUBLICATIONS

Gokturk et al., "Medical image compression based on region of interest, with application to colon CT images", 2001 Conference Proceedings of the 23rd Annual International Conference of the IEEE Engineering in Medicine and Biology Society, vol. 3, 2001, pp. 2453-2456.
Anahita et al., "Lossless Microarray Image Compression Based on Foreground Extraction", Electrical and Computer Engineering Canadian Conference, 2006, pp. 106-109.
Strom et al., "Medical image compression with lossless regions of interest", Signal Processing, Elsevier Science Publishers B.V. Amsterdam, NL, vol. 59, No. 2, 1997, pp. 155-171.
Balraju et al., "Comparative Study of the Effect of Lossy and Lossless Block Based Binary Plane Techniques on Medical Images", Journal of Computer Sciences, Science Publications USA, vol. 6, No. 11, 2010, pp. 1377-1380.

* cited by examiner

*Primary Examiner* — Avinash J Yentrapati
(74) *Attorney, Agent, or Firm* — O'Shea Getz P.C.

(57) ABSTRACT

A method and apparatus for analyzing white blood cells (WBCs) within a whole blood sample quiescently residing within a chamber is provided. The chamber is defined by at least one transparent panel, and the whole blood sample includes at least one colorant operable to differentially identify at least one WBC type from another WBC type within the sample. The method includes the steps of: a) creating at least one image of the sample quiescently residing within the chamber; b) identifying portions of the sample image, with each portion representing a single WBC; c) compressing the sample image portions using a first compression algorithm; and d) one of compressing a remainder of the sample image not included in the portions using a second compression algorithm, or discarding the remainder.

19 Claims, 14 Drawing Sheets
(8 of 14 Drawing Sheet(s) Filed in Color)

|  | Lymphocyte | Neutrophil | Eosinophil | Monocyte |
|---|---|---|---|---|
| Composite Image | 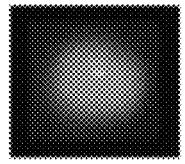<br>*FIG. 4A* | 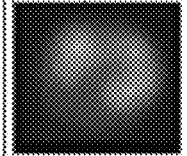<br>*FIG. 4B* | 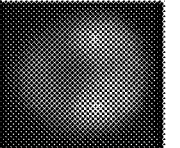<br>*FIG. 4C* | 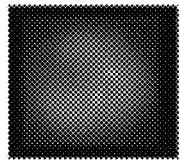<br>*FIG. 4D* |
| FL Red | 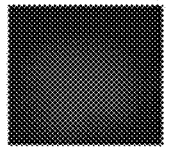<br>*FIG. 5A* | 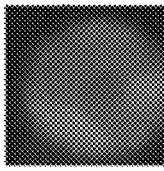<br>*FIG. 5B* | 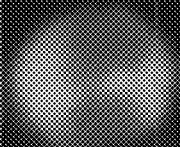<br>*FIG. 5C* | 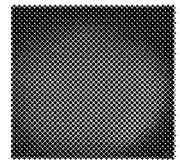<br>*FIG. 5D* |
| FL Green | 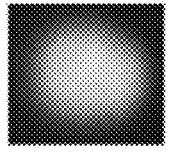<br>*FIG. 6A* | 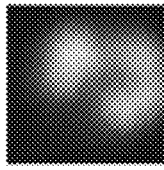<br>*FIG. 6B* | 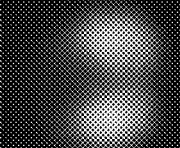<br>*FIG. 6C* | 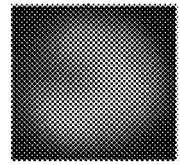<br>*FIG. 6D* |
| TL Blue OD | 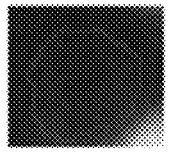<br>*FIG. 7A* | 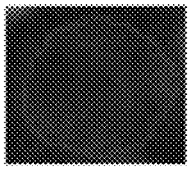<br>*FIG. 7B* | 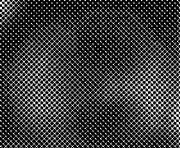<br>*FIG. 7C* | <br>*FIG. 7D* |
| Cell Mask | 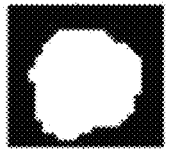<br>*FIG. 8A* | <br>*FIG. 8B* | 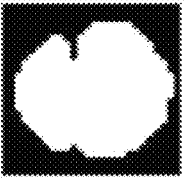<br>*FIG. 8C* | <br>*FIG. 8D* |

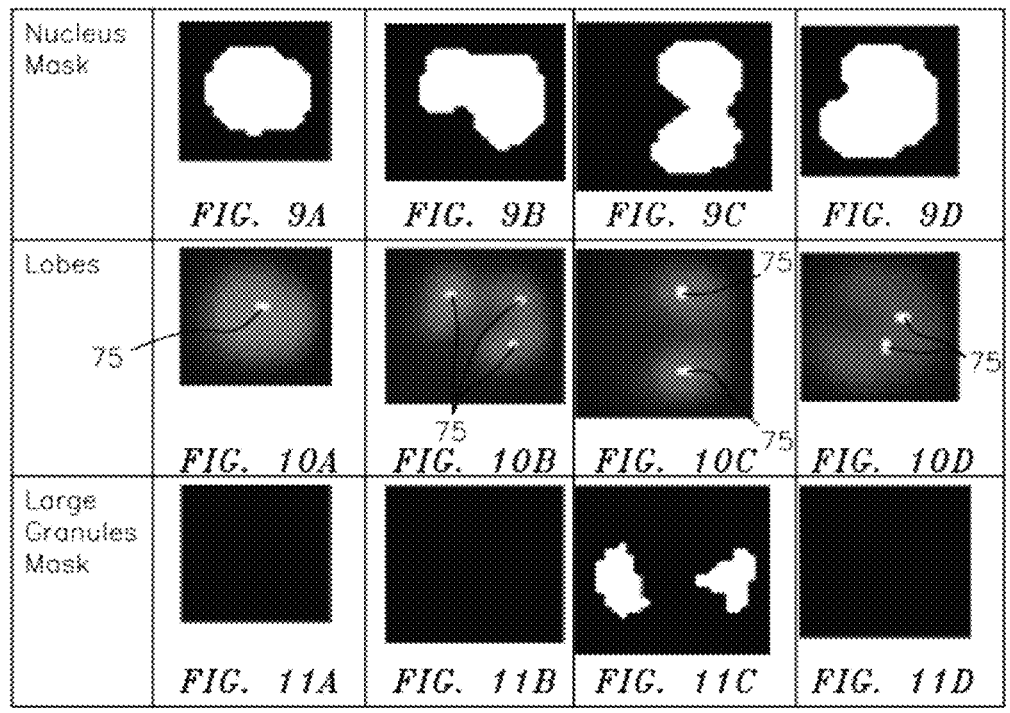
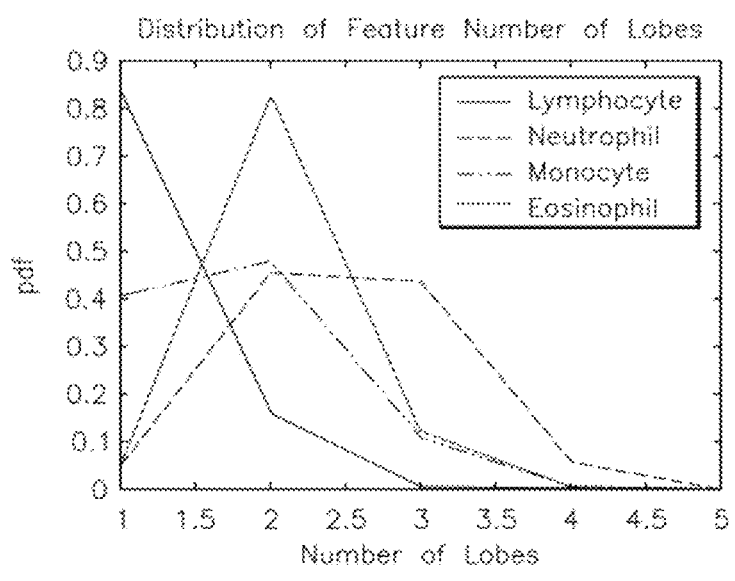
FIG. 12

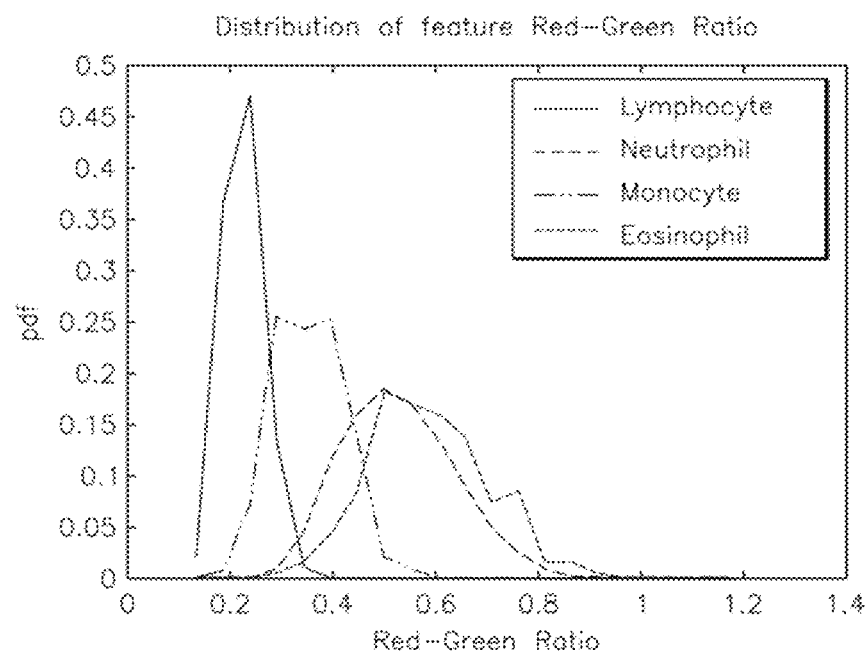
*FIG. 17*
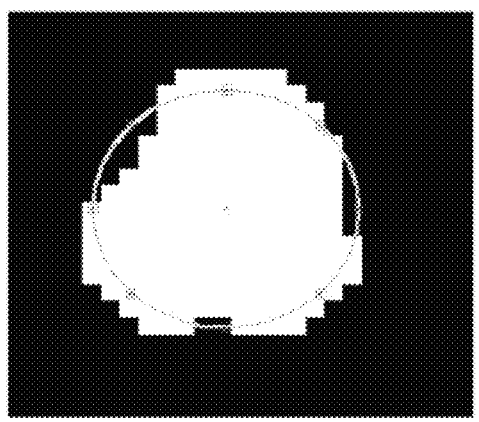 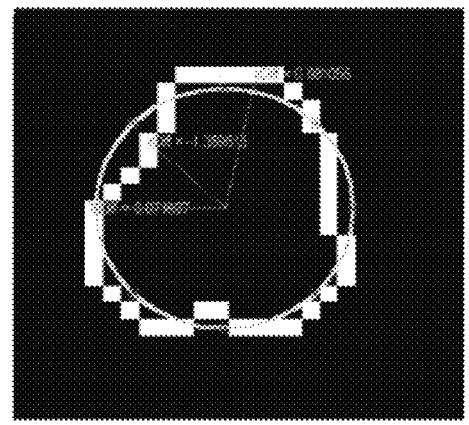
*FIG. 18*   *FIG. 19*

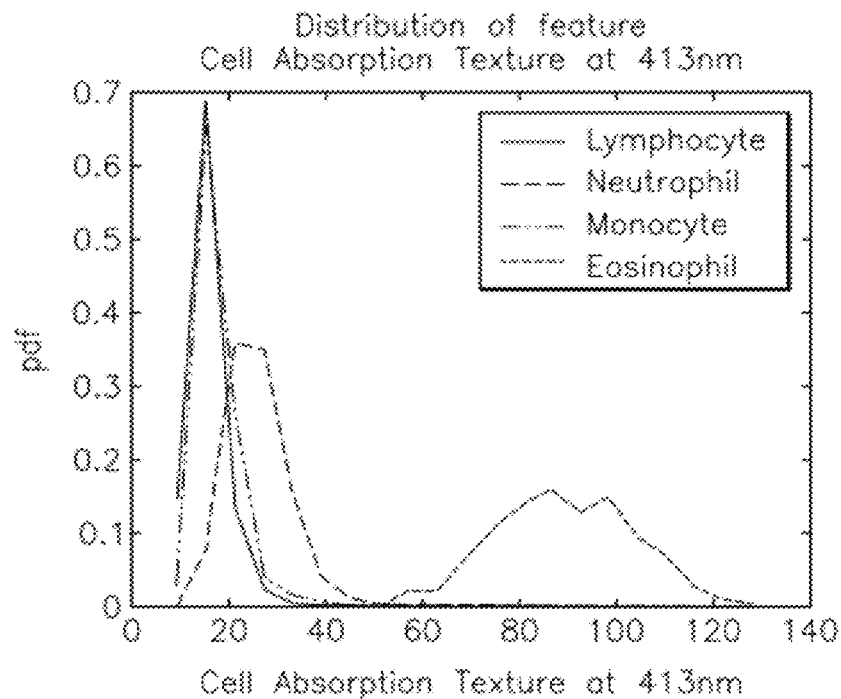

FIG. 28

| Cell Type | Dominant Distinguishing Cell Features |
|---|---|
| Lymphocyte | Number of Lobes<br>Cell Area<br>Ratio of Nucleus<br>Nucleus Shape |
| Neutrophil | Number of Lobes<br>Cell Area<br>Ratio of Nucleus<br>Nucleus Shape |
| Monocyte | Number of Lobes<br>Cell Area<br>Ratio of Nucleus |
| Eosinophil | Average Cell Absorption at a given wavelength<br>Cell Absorption Texture at a given wavelength<br>Ratio of Large Granules |

FIG. 29

METHOD AND APPARATUS FOR COMPRESSING IMAGING DATA OF WHOLE BLOOD SAMPLE ANALYSES

BACKGROUND OF THE INVENTION

1. Technical Field

The present invention relates to methods and apparatus for performing analyses on whole blood samples from microscopy images in general, and to methods and apparatus for compressing imaging data of the same in particular.

2. Background Information

Medical diagnostics often include analyses of a whole blood sample from a patient. One of the more popular diagnostics is a complete blood count (referred to as a "CBC"), which is a suite of tests that may include, in addition to the enumeration of the cellular components, red blood cell metrics, reticulocyte counts, and a leukocyte differential count ("LDC"; sometimes referred to as a "white blood cell differential"), which is the identification and enumeration of the types of white blood cells (WBCs) present in the blood sample.

Historically, the differential aspects of the CBC have been performed using separate methods from those used for enumeration. For example, the LDC portion of a CBC historically has been performed by smearing a small amount of undiluted blood on a slide, staining the dried, fixed smear, and examining the smear under a microscope. Reasonable results can be gained from such a smear, but the accuracy and reliability of the data depends largely on the technician's experience and technique. Blood smears are problematic for several reasons; e.g., the cells must be killed and fixed, which process precludes many types of supravital stains and analyses whose results depend upon living cells, and blood smears are labor intensive, cost prohibitive, and time consuming. For at least these reasons, blood smears are generally not favored for commercial applications.

Attempts to automate analyses of whole blood samples have met with some success, but typically have several drawbacks. For example, electrical impedance or optical flow cytometry instruments can be used to perform an LDC. Flow cytometry involves passing a diluted blood sample through a small vessel wherein electrical impedance or optical sensors can evaluate the constituent cells as they pass serially through the vessel. These instruments typically require fluid handling equipment and require the sample be diluted.

Analyses of biological fluid specimens using color images can be hindered by the substantial size of the image files. Large image files can consume storage space, impede transfer to a remote location, and/or slow processing.

What is needed is an apparatus and method for performing automated analyses on a whole blood sample, including an LDC, which facilitate handling and storage of large image files.

SUMMARY OF THE INVENTION

According to an aspect of the present invention, a method for analyzing white blood cells (WBCs) within a whole blood sample quiescently residing within a chamber is provided. The chamber is defined by at least one transparent panel, and the whole blood sample includes at least one colorant operable to differentially identify at least one WBC type from another WBC type within the sample. The method includes the steps of: a) creating at least one image of the sample quiescently residing within the chamber; b) identifying portions of the sample image, with each portion representing a single WBC; c) compressing the sample image portions using a first compression algorithm; and d) one of compressing a remainder of the sample image not included in the portions using a second compression algorithm, or discarding the remainder.

According to another aspect of the present invention, a method for imaging white blood cells (WBCs) within a whole blood sample quiescently residing within a chamber is provided. The chamber is defined by at least one transparent panel. The method includes the steps of: a) creating at least one image of the sample quiescently residing within the chamber; b) identifying portions of the sample image and a location of each portion within the sample image, with each portion representing a single WBC; c) compressing the sample image portions using a first compression algorithm; d) one of compressing a remainder of the sample image not included in the portions using a second compression algorithm, or discarding the remainder; and e) decompressing the sample image portions and collectively displaying the portions, with each portion relatively located based on its location within the sample image.

According to another aspect of the present invention, an apparatus for analyzing a whole blood sample quiescently residing within a chamber is provided. The apparatus includes an objective lens, a sample illuminator, an image dissector, and a programmable analyzer. The sample illuminator is operable to provide a fluorescent excitation light and one or more transmission lights. The image dissector is adapted to receive one or both of light fluorescing from the sample and light transmitted through the sample, and to produce signals representative of such light. The programmable analyzer is adapted to receive the signals representative of the light and create at least one image of the sample quiescently residing within the chamber. The analyzer is further adapted to quantitatively analyze the sample image and identify portions of the sample image, each portion representing a single white blood cell (WBC) within the image. The analyzer is further adapted to selectively compress the sample image portions using a first compression algorithm, and either compress a remainder of the sample image not included in the portions using a second compression algorithm, or discard the remainder.

These and other objects, features and advantages of the present invention will become apparent in light of the detailed description of the invention provided below, and as illustrated in the accompanying drawings.

BRIEF DESCRIPTION OF THE DRAWINGS

The application file contains at least one drawing executed in color. Copies of this patent or patent application publication with color drawing(s) will be provided by the Office upon request and payment of the necessary fee.

The principles of the invention are further clarified by referring to the following figures, where:

FIGS. 4A-4D are composite images of a lymphocyte (4A), a neutophil (4B), an eosinophil (4C), and a monocyte (4D).

FIGS. 5A-5D are images of red light fluorescing from a lymphocyte (5A), a neutophil (5B), an eosinophil (5C), and a monocyte (5D).

FIGS. 6A-6D are images of green light fluorescing from a lymphocyte (6A), a neutophil (6B), an eosinophil (6C), and a monocyte (6D).

FIGS. 7A-7D are images of optical density at a blue light wavelength with cell boundary marked by red curves for a lymphocyte (7A), a neutophil (7B), an eosinophil (7C), and a monocyte (7D).

FIGS. 8A-8D are images of Cells where contiguous pixels depicting red and green light fluorescence above a predetermined intensity are masked for a lymphocyte (8A), a neutophil (8B), an eosinophil (8C), and a monocyte (8D).

FIGS. 9A-9D are images of Cells where contiguous pixels depicting green light fluorescence above a predetermined intensity are masked for a lymphocyte (9A), a neutophil (9B), an eosinophil (9C), and a monocyte (9D).

FIGS. 10A-10D are images that include one or more groups of contiguous pixels depicting a regional maximum intensity in a fluorescent green channel for a lymphocyte (10A), a neutophil (10B), an eosinophil (10C), and a monocyte (10D).

FIGS. 11A-11D are images of Cells where contiguous pixels having a blue OD value above a predetermined threshold are masked for a lymphocyte (11A), a neutophil (11B), an eosinophil (11C), and a monocyte (11D).

FIG. 12 is a graph depicting empirical data (in the form of a probability density function—pdf) collected from a training set of sample images for each of lymphocytes, neutrophils, eosinophils, and monocytes, versus a number of Lobes. The term "probability density function" describes the likelihood that a feature has a particular value. For features with discrete values like the number of lobes, the pdf is the same as the frequency that a feature has a particular value. For example, FIG. 12 shows that around 83% of the lymphocytes within a population have just one lobe, around 15% of the lymphocytes have two lobes. Note this number of lobes is computed from the sample images and thus can have a value different from the actual biologic constituents due to image imperfection and limitation of the image analyzing algorithm. All the features computed for the images are approximations of their corresponding biological ones and some degree of inaccuracy is inherent. However, under the present invention these inherent inaccuracies can be greatly reduced by utilizing multiple features together during the analysis (e.g., an LDC), thereby resulting in an analysis having a high degree of accuracy.

FIG. 17 is a graph depicting empirical data (in the form of a pdf) collected from a training set for each of lymphocytes, neutrophils, eosinophils, and monocytes, versus the Red-Green Ratio for each of the aforesaid WBCs.

FIG. 18 is an image depicting the pixels associated with the Nucleus of a Cell masked out, with a circle applied to the image to approximate the masked area.

FIG. 19 is a version of the image shown in FIG. 18, highlighting only those pixels at the boundary of the masked area (i.e., at the boundary of the Nucleus), including a centroid and a few illustrative positioning line segments extending between the centroid and the relevant boundary pixel.

FIG. 24B contains images similar to those in FIG. 24A, including encircling lines to facilitate the identification of the inner and outer parts.

FIG. 28 is a graph depicting empirical data (in the form of a pdf) collected from a training set for each of lymphocytes, neutrophils, eosinophils, and monocytes, versus the Cell Absorption Texture at 413 nm for each of the aforesaid WBCs.

FIG. 29 is a table of WBC types and features associated with the particular WBC type.

DETAILED DESCRIPTION OF THE INVENTION

The present method and apparatus is directed toward creating an image of a biological fluid sample, and processing that image to create one or more image analysis data files. The processing utilizes one or more compression algorithms operable to compress an image analysis data file to a smaller size while maintaining acceptably low levels of information loss. The image analysis data is typically generated by an analysis of an image of a biological fluid sample quiescently residing within an analysis chamber. The analysis includes identifying and locating particular constituents within the sample.

An exemplary analysis involves performing a leukocyte differential count ("LDC") on a whole blood sample. As indicated above, an LDC is an analysis wherein the different types of WBCs are identified and enumerated. The results can be expressed in terms of the relative percentages of identified WBC types; e.g., monocytes, eosinophils, neutrophils, and lymphocytes within a blood sample. A detailed description of a methodology for performing an LDC on a whole blood sample is provided in U.S. Patent Application No. 61/371,020 filed Aug. 6, 2010, which application is hereby incorporated by reference in its entirety. To facilitate the explanation of the present method and apparatus for processing image analysis data files, the present method and apparatus will be explained in terms of image analysis data produced via an LDC performed on a whole blood sample. The present method and apparatus is not limited to use with this particular type of analysis application, however, and can be used with other analyses.

Figure 1:
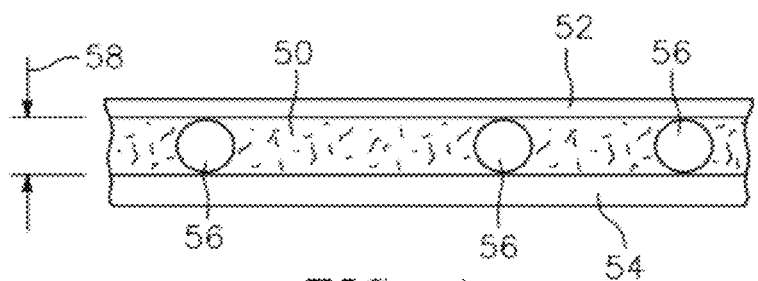
FIG. 1 is a diagrammatic section view of a chamber.
Figure 2:
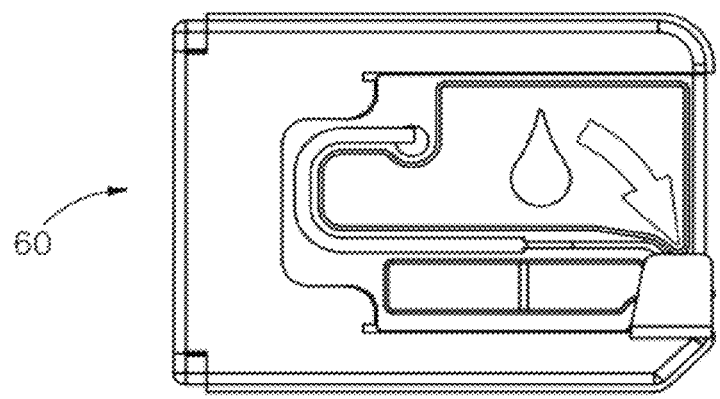
FIG. 2 is a diagrammatic top view of a biologic fluid sample cartridge, of the type that can include a chamber such as that shown in FIG. 1.
Figure 3:
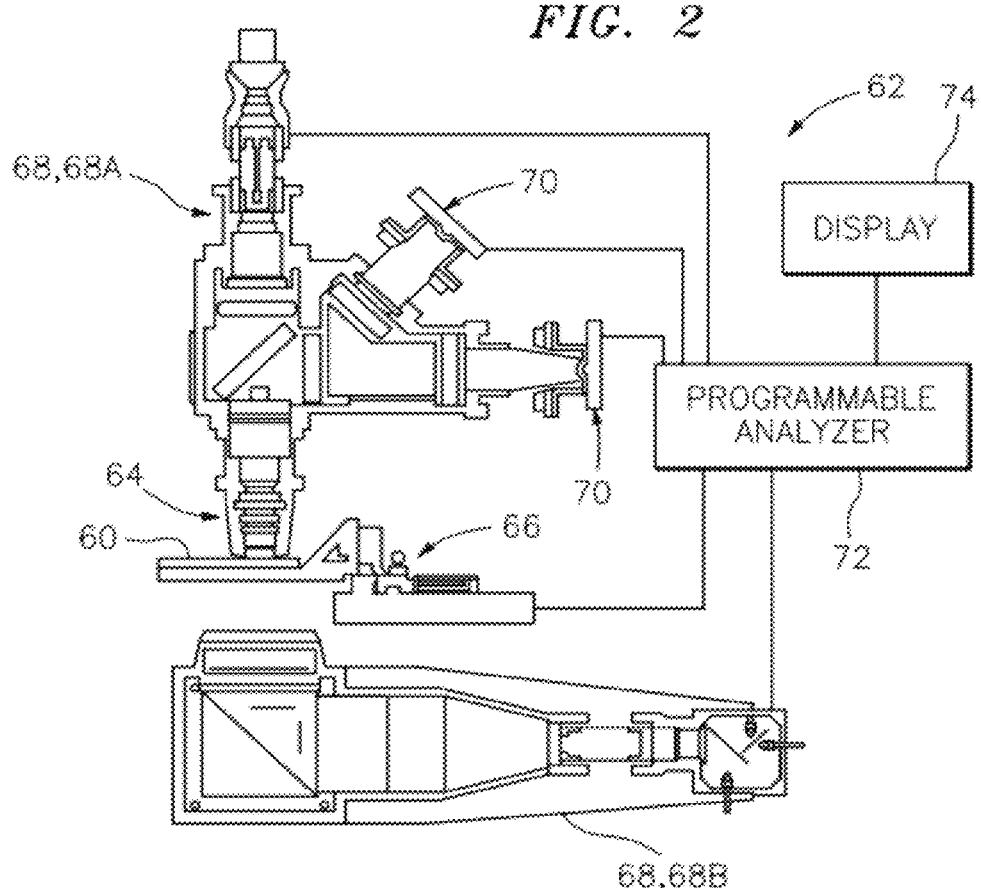
FIG. 3 is a diagrammatic view of an analysis device operable to perform an analysis on a sample disposed within a chamber.

Now referring to FIGS. 1-3, the present method and apparatus includes the provision of an automated analysis device 62 (shown diagrammatically in FIG. 3) adapted to image, analyze, and process a sample quiescently residing within a chamber 50 (see FIG. 1). The chamber 50 is formed by a first planar member 52 and a second planar member 54, at least one of which planar members 52,54 is transparent. In some embodiments, the chamber 50 includes at least three separators 56 disposed between the planar members 52,54. Examples of acceptable chambers are described in U.S. Patent Application Publication No. 2007/0243117 and U.S. Patent Provisional Application No. 61/287,955, each of which applications is hereby incorporated by reference in its entirety. FIG. 1 diagrammatically shows a chamber 50 that can be disposed within a sample collection and analysis cartridge 60 such as that shown in FIG. 2.

The analysis device 62 (shown diagrammatically in FIG. 3) includes imaging hardware and a processor (e.g., programmable analyzer) for capturing, analyzing, and processing images of the sample. The analysis device 62 typically includes an objective lens 64, a chamber positioning device (e.g., a motorized stage) 66, a sample illuminator 68, an image dissector 70, and a programmable analyzer 72. One or both of the objective lens 64 and chamber positioning device 66 are movable toward and away from each other to change a relative focal position of the device 62 relative to the chamber 50 and the sample disposed therein.

The sample illuminator 68 illuminates the sample using light along predetermined wavelengths. For example, the sample illuminator can include an epi-fluorescence light source 68A and a transmission light source 68B. As will be explained below, colorants such as Acridine Orange (also referred to as "Basic Orange 15") and Astrazon Orange (also referred to as Basic Orange 21) emit light at particular wavelengths when mixed with whole blood and subjected to an excitation wavelength from the epi-fluorescent light source, which source typically produces light within the range of about 450-490 nm. An excitation wavelength at about 470 nm is particularly useful. The transmission light source is operable to produce light at wavelengths associated with one or more of red, green, and blue light. The red light is typically produced in the range of about 600-700 nm, with red light at about 660 nm preferred. The green light is typically produced in the range of about 515-570 nm, with green light at about 540 nm preferred. As will be discussed below, the blue light is typically in the range of about 405-425 nm, with blue light at about 413 nm preferred. Light transmitted through the sample, or fluoresced from the sample, is captured using the image dissector, and a signal representative of the captured light is sent to the programmable analyzer, where it is processed into an image. The image is produced in a manner that permits the light transmittance or fluorescence intensity captured within the image to be determined on a per unit basis; e.g., "per unit basis" being an incremental unit of which the image of the sample can be dissected, such as a pixel. For clarity of description, the LDC algorithm is described herein as being on a "per pixel basis". The per unit basis is not limited to a pixel, however.

An example of an acceptable image dissector 70 is a charge couple device (CCD) type image sensor that converts light passing through (or from) the sample into an electronic data format image. Complementary metal oxide semiconductors ("CMOS") type image sensors are another example of an image sensor that can be used. The signals from the image dissector 70 provide information for each pixel of the image, which information includes, or can be derived to include, intensity, wavelength, and optical density. Intensity values are assigned an arbitrary scale of, for example, 0 units to 4095 units ("IVUs"). Optical density ("OD") is a measure of the amount of light absorbed relative to the amount of light transmitted through a medium; e.g., the higher the "OD" value, the greater the amount of light absorbed during transmission. OD can be quantitatively described in optical density units ("OD") or fractions thereof; e.g., a MilliOD is a $\frac{1}{1000}^{th}$ of an OD. One "OD" unit decreases light intensity by 90%. "OD" or "MilliOD" as a quantitative value can be used for images acquired or derived by transmission light, for example, the transmission blue light illustrates in FIGS. 7A-7D. The information from the image dissector 70 is separated into multiple channels. The information from the image dissector 70 will be described hereinafter as being separated into three channels, which number provides particular utility for determining a four part LDC. The present invention is not limited to a three channel embodiment, however. A first of the three channels is directed toward information relating to light emitted from the sample at a first wavelength (e.g., 540 nm, which appears green). A second channel is directed toward information relating to light emitted from the sample at a second wavelength (e.g., 660 nm, which appears red). A third channel is directed toward information relating to light passing through the sample at a third wavelength (e.g., 413 nm, which is used to determine blue optical density—"OD"). These wavelength values and the number of channels have particular utility when an LDC is being performed on a whole blood sample. The present invention is not limited to these particular wavelengths or number of channels. Additional channels can be implemented to gather information at different wavelengths and/or transmission values. That information, in turn, can be used to evaluate additional constituents within the sample and/or to increase the accuracy of the analysis. For example, in applications where it is desirable to further differentiate basophils within the sample, a fourth and a fifth channel can be added. The fourth channel can be directed toward information relating to light passing through the sample at a fourth wavelength (e.g., 540 nm), which is used to determine green OD, and the fifth channel can be directed toward information relating to light passing through the sample at a fifth wavelength (e.g., 660 nm), which is used to determine red OD. These OD values, in turn, can be used to identify basophils.

The programmable analyzer 72 includes a central processing unit (CPU) and is in communication with the chamber positioning device 66, sample illuminator 68, image dissector 70, and a display 74. The programmable analyzer 72 is adapted (e.g., programmed) to send and/or receive signals from one or more of the chamber positioning device 66, the sample illuminator 68, an image dissector 70, and a display 74. For example, the analyzer 72 is adapted to: 1) send and receive signals from the chamber positioning device to position the chamber 50 relative to one or more of the optics, illuminator, and image dissector; 2) send signals to the sample illuminator to produce light at defined wavelengths (or alternatively at multiple wavelengths); and 3) send and receive signals from the image dissector to capture light for defined periods of time. The programmable analyzer 72 is further adapted to communicate with the display 74 to permit viewing of an image of the sample. It should be noted that the functionality of the programmable analyzer 72 may be implemented using hardware, software, firmware, or a combination thereof. A person skilled in the art would be able to program the processing unit to perform the functionality described herein without undue experimentation.

The display 74 (e.g., an LCD screen) may be incorporated into the analysis device 62 and/or an external display may be connectable to the analysis device 62 to permit a user to view an image of the sample.

As indicated above, the programmable analyzer 72 processes signals from the image dissector 70 into an image of the quiescent sample, which image is collectively represented by a substantial number of pixels. Each pixel provides information that includes, or can be derived to include, intensity, wavelength, and optical density of the captured light. The image sample may be viewed and/or processed as a single image, or sectionally in portions of the image referred to as "frames". The image portions represented in the frames may be collectively assembled to produce a single image. The programmable analyzer 72 is further adapted to process the signals received from the image dissector 70 according to one or more analysis algorithms, including the LDC algorithm described herein, and thereby provide analysis data relating to the image.

To perform the LDC, the algorithm utilizes a set of identifying features, each of which features is distinguishable from the other features and each of which is quantitatively determinable from an image of the sample. Each WBC can be characterized by the presence or absence of certain identifying features, and/or by quantitative information associated with certain features. The algorithm is described herein in terms of an exemplary set of identifying features that can be used to selectively identify and distinguish WBCs. The algorithm is not limited to this particular set of features.

For a WBC analysis, an exemplary set of identifying features includes those entitled: Cell, Nucleus, number of Lobes, Cell Area, Nucleus Area, Ratio of Large Granules, Ratio of Nucleus, Red-Green Ratio, Nucleus Shape, Cell Shape, Nucleus Brightness, Cytoplasm Brightness, Average Cell Absorption at a Given Wavelength, Nucleus Texture, Cytoplasm Texture, Cell Absorption Texture at a Given Wavelength, Nucleus Hollowness, and Cytoplasm Hollowness; each of which is described below.

In some instances, certain features directly provide information about a particular cell (e.g., Nucleus Shape). In other instances, a feature (e.g., Cell Area) can be used to indirectly provide information about a particular cell (e.g., ratio of Nucleus Area to Cell Area—referred to above as "Ratio of Nucleus", etc.).

The identifying features are based on characteristics such as light intensity, light color, OD, area, and relative pixel position (e.g., the shape of pixel clusters). The colors are produced by one or more colorants admixed with the sample, which upon excitation, produce fluorescent light emission at particular wavelengths associated with particular colors. An example of an acceptable colorant that can be used when performing an LDC on a whole blood sample is Acridine Orange ("ACO"). ACO is a fluorescent dye that, when mixed with a whole blood sample, selectively stains constituents within the sample; e.g., white blood cells, platelets, reticulocytes, and nucleated red blood cells. With respect to WBCs, the ACO permeates through the respective WBC and stains its DNA and RNA. The color(s) emitted by the dye within the WBC are a function of a number of factors, including: the quantity of RNA and DNA within the dye, the concentration of the dye in the constituent, and the pH of the constituent. The present invention is not limited to using ACO, and other dyes (e.g., Astrazon Orange) may be used in place of ACO or in combination with ACO. Using ACO and white blood cells as an example, if the sample is subjected to an excitation light at or about a wavelength of 470 nm, the ACO bound to materials (e.g., DNA) within the nucleus of a white blood cell will emit light at about 540 nm (which appears green), and the ACO bound to materials (e.g., RNA) within the cytoplasm of a white blood cell will emit light at about 660 nm (which appears red).

As indicated above, OD values within the sample are a function of absorbtivity of light at predetermined wavelengths by materials that naturally occur within the cell (e.g., hemoglobin), and/or may be a function of colorant absorbed (or not absorbed) by constituents within the sample.

As will be explained below, characteristics of pixel groups can provide information useful in the identification of certain types of WBCs. The identification of particular groups of pixels at one or more defined wavelengths can be performed using a variety of different techniques. For example, segmentation techniques can be used to produce a masked image depicting only those pixels within the image that meet defined criteria (e.g., intensity and color). The present invention is not limited to any particular segmentation technique, and a specific technique can be chosen in view of the application at hand. The present invention is also not limited to using a segmentation technique, and can use other techniques that select (i.e., "pick") pixels or otherwise distinguish pixels having particular attributes.

The description of each of the identifying features below will provide clear examples of how quantitative data such as that associated with wavelength and intensity can provide a basis for distinguishing one WBC from another.

The term "Cell" refers to an identifying feature that includes a group of substantially contiguous pixels within the image depicting green light emission and/or red light emission at a high level of intensity (i.e., at or above a predetermined IVU threshold) relative to the intensity of the entire image. Hence, the quantitative values define those pixels that have the predetermined color (e.g., red and green) at or above a predefined intensity level. FIGS. 4A-4D, for example, illustrate a region containing WBCs within the specimen image showing green light and red light. FIGS. 8A-8D illustrate a region at or above the threshold intensity level; i.e., a group of substantially contiguous pixels within the above images that define a cell.

The term "Nucleus" refers to an identifying feature that includes a group of contiguous pixels within the image depicting green light emission at a high intensity level relative to the intensity level of the entire image. As indicated above, segmentation techniques can be used to produce a masked image depicting only those pixels within the image that meet the criteria of green emission at or above the predetermined intensity threshold. Each group of contiguous pixels within the image depicting green light emission at or above the IVU threshold is thereby characterized as a "Nucleus" feature. As indicated above, FIGS. 9A-9D illustrate a masked image showing a Nucleus feature.

The term "Lobe" refers to an identifying feature that includes a group of contiguous pixels within the image that are a regional maximum intensity in the fluorescent green channel (e.g., 540 nm). The term "regional maximum intensity" refers to a group of pixels having substantially the same intensity value, which value is noticeably greater than surrounding pixels. FIG. 10A illustrates a WBC having a single lobe 75, identifiable by the single group of pixels exhibiting regional maximum emission intensity. FIGS. 10C and 10D illustrate a WBC having a pair of Lobes 75. FIG. 10B illustrates a WBC having three Lobes 75. FIG. 12 graphically illustrates the differences in number of Lobes associated with lymphocytes, neutrophils, monocytes, and eosinophils. The number of Lobes 75 associated with neutrophils, for example, makes number of Lobes an identifying feature that can be used to distinguish neutrophils.

Figure 13:
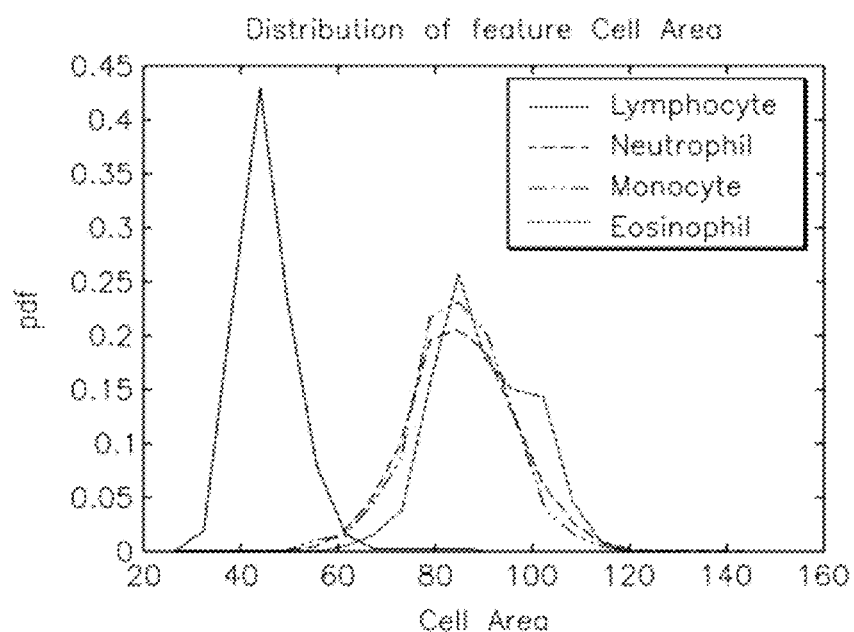
FIG. 13 is a graph depicting empirical data (in the form of a probability density function—pdf) collected from a training set for each of lymphocytes, neutrophils, eosinophils, and monocytes, versus the determined Cell Area for each of the aforesaid WBCs.

"Cell Area" is an identifying feature that refers to the area within the image that is identified as a particular Cell. Because each pixel represents a known area of the image, the area of a given cell or other constituent or element can be determined from the number of pixels. FIG. 13 graphically illustrates the differences in Cell Area associated with lymphocytes, neutrophils, monocytes, and eosinophils. The Cell Area associated with lymphocytes, for example, makes Cell Area an identifying feature that can be used to distinguish lymphocytes.

"Nucleus Area" is an identifying feature that refers to the area within the image that is identified as a particular Nucleus.

Figure 14:
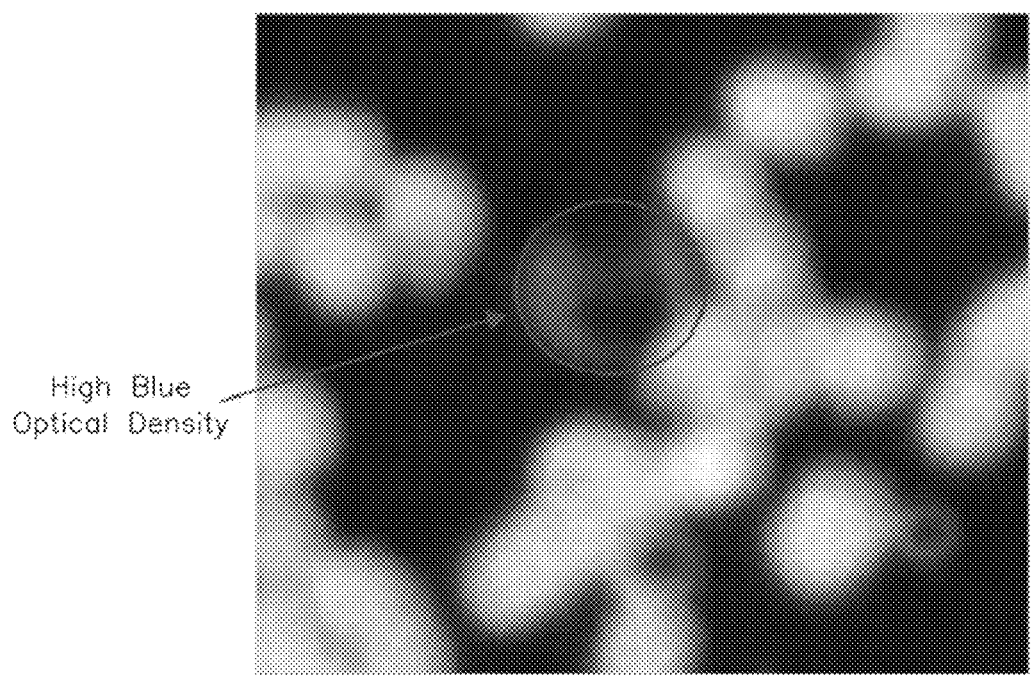
FIG. 14 is an image depicting the high blue OD areas within a Cell.
Figure 15:
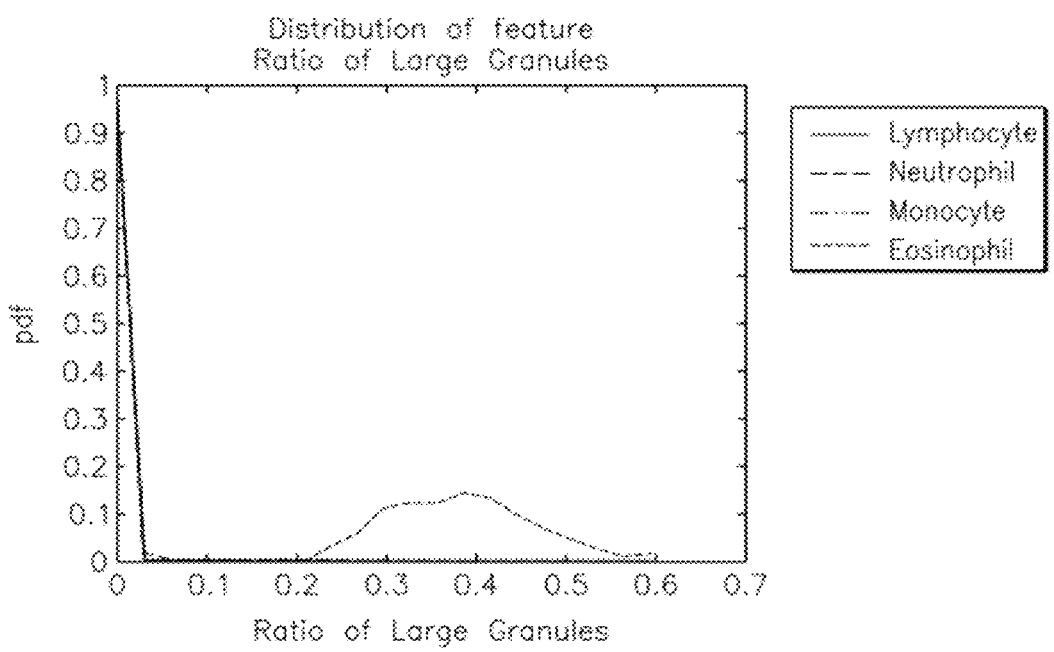
FIG. 15 is a graph depicting empirical data (in the form of a pdf) collected from a training set for each of lymphocytes, neutrophils, eosinophils, and monocytes, versus the Ratio of Large Granules for each of the aforesaid WBCs.

"Ratio of Large Granules" is an identifying feature that is a ratio of the sum of high blue OD areas within a Cell, over the Cell Area. The term "high blue OD area"—also referred to as a "Large Granule"—refers to a group of contiguous pixels within the image that have a blue OD value that is above a predetermined threshold. The blue OD value is created by transmitting blue light at a wavelength of about 413 nm through the sample. The transmitted blue light that is used to determine the blue OD value, can be in the range of about 405-425 nm. Transmitted blue light at about 413 nm is advantageous because at or about 413 nm is where hemoglobin (HGB) has peak absorption. Each Large Granule appears as a group of bright pixels within the OD image and each is detected by segmentation techniques within an OD image, masking all pixels except those that have an OD above a predetermined threshold (e.g., >300 milliOD). FIG. 14 illustrates an example of high blue OD areas within a Cell (i.e., large granules within an eosinophil). FIGS. 11A-11D further illustrate the pixels with high blue OD in different types of WBCs. Our research to date indicates that relative to the Cells considered within the LDC, only eosinophils have significant regions of the high intensity blue OD within the Cell. FIG. 15 graphically illustrates the differences in the Ratio of Large Granules associated with lymphocytes, neutrophils, monocytes, and eosinophils. As can be seen from FIG. 15, the Ratio of Large Granules identifying feature readily distinguishes eosinophils from the other constituents within the LDC.

Figure 16:
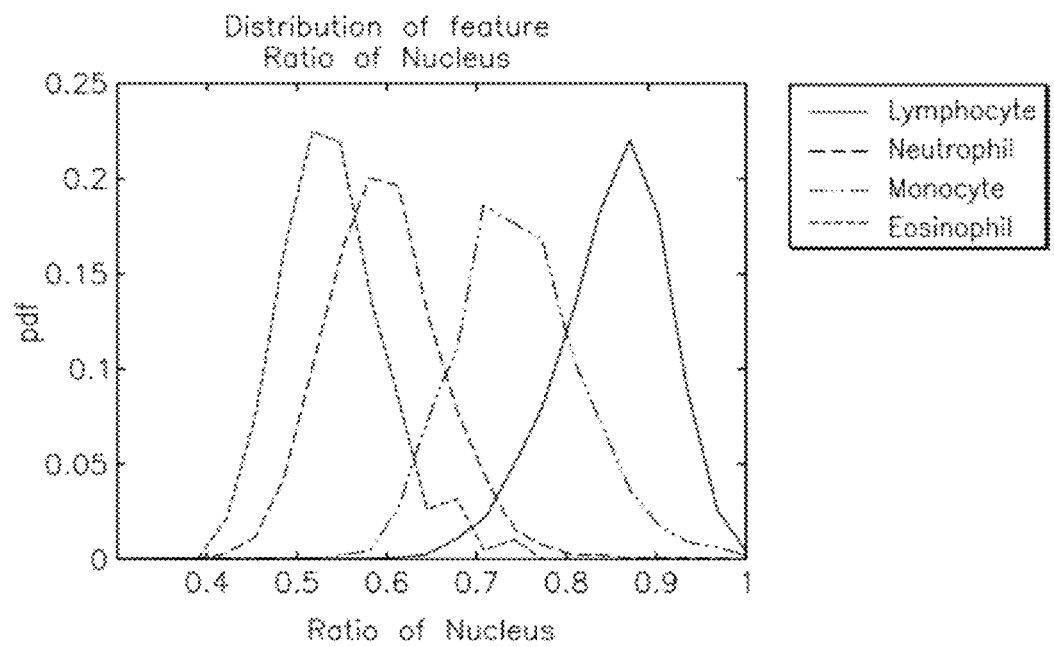
FIG. 16 is a graph depicting empirical data (in the form of a pdf) collected from a training set for each of lymphocytes, neutrophils, eosinophils, and monocytes, versus the Ratio of Nucleus for each of the aforesaid WBCs.

"Ratio of Nucleus" is an identifying feature that is a ratio of a Nucleus Area over the Cell Area, as defined above. FIG. 16 graphically illustrates the differences in the Ratio of Nucleus associated with lymphocytes, neutrophils, monocytes, and eosinophils. The Ratio of Nucleus associated with lymphocytes, for example, makes Ratio of Nucleus an identifying feature that can be used to distinguish lymphocytes.

"Red-Green Ratio" is an identifying feature that is a ratio of the mean intensity value of those pixels (or area) within an identified Cell depicting fluorescent red light, over the mean intensity value of those pixels (or area) within the identified Cell depicting fluorescent green light. FIGS. 5A and 6A (or 5B and 6B, or 5C and 6C, or 5D and 6D) illustrate the combined fluorescent red and fluorescent green of a particular type of Cell. The image shown in FIG. 5A (or 5B, 5C, or 5D) is a partial image depicting only the component from the fluorescent red light, and the image shown in FIG. 6A (or 6B, 6C, or 6D) is a partial image of the same Cell depicting only the component from the fluorescent green light. The Red-Green Ratio is the ratio of the mean intensity values of the respective colors. FIG. 17 graphically illustrates the differences in the Red-Green Ratio associated with lymphocytes, neutrophils, monocytes, and eosinophils. The Red-Green Ratio associated with lymphocytes, for example, makes Red-Green Ratio an identifying feature that can be used to distinguish lymphocytes.

"Nucleus Shape" is an identifying feature that describes the circularity of a Nucleus. A variety of geometric techniques can be used to determine the circularity of a nucleus within the specimen image, which nucleus appears as a two-dimensional body within the image. For example, in terms of a single Cell, a segmentation technique can be used to identify those pixels that are associated with the nucleus of the Cell (i.e., those pixels that show green). Once the Nucleus pixels are identified, the pixels located at the boundary of the Nucleus are identified. The centroid of the Nucleus (i.e., the centroid of the area covered by the Nucleus) can be defined by averaging the position of all of the boundary pixels. A circle that approximates the pixel defined body, and which is centered on the centroid, is applied to the pixel body. FIG. 18 illustrates an example of a nucleus defined by pixels within a masked image, and a circle applied to the pixel body. FIG. 19 illustrates the corresponding boundary pixels. The locations of the boundary pixels are collectively used to determine the circularity of the Nucleus; e.g., the deviation value of the boundary pixels from the approximating circle. For example, the location of each boundary pixel can be described in normalized terms by dividing the difference of the radius of the boundary pixel ($r_{BP}$) less the radius of the circle ($r_c$), by the radius of the circle:

$$rNormalized = \frac{rDiff}{r_c} = \frac{r_{BP} - r_c}{r_c}$$

Figure 20:
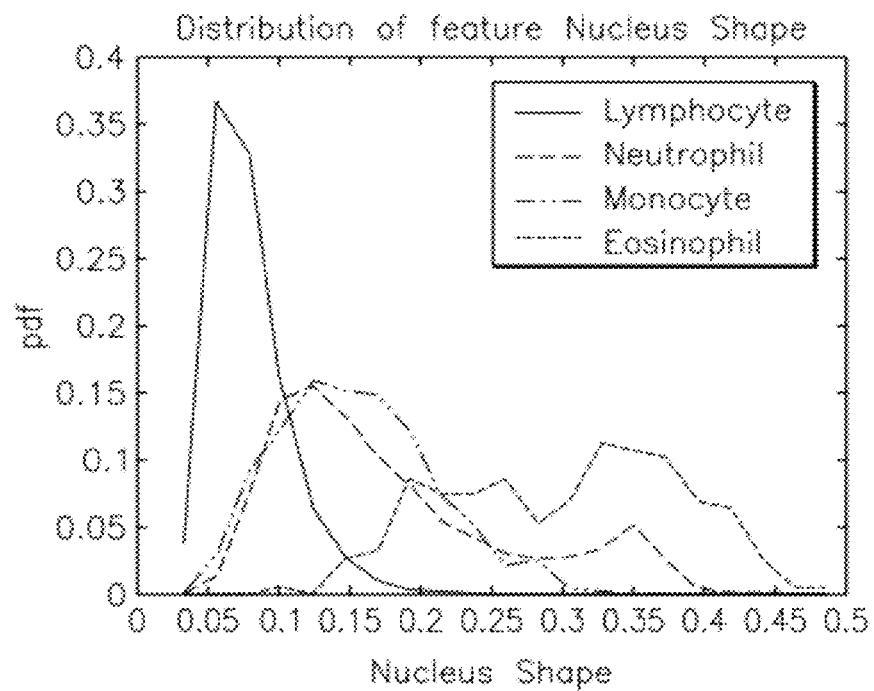
FIG. 20 is a graph depicting empirical data (in the form of a pdf) collected from a training set for each of lymphocytes, neutrophils, eosinophils, and monocytes, versus the Nucleus Shape for each of the aforesaid WBCs.

If the boundary pixel is located on the circle, the numerator ($r_{BP} - r_c$) equals zero and the deviation is zero. The deviation (rNormalized) from the circularity can then be used as a measure of the circularity of the shape; e.g., the circularity of the Nucleus. FIG. 20 depicts a graph comparing the circularity of the Nucleus for a statistically significant population of lymphocytes, neutrophils, monocytes, and eosinophils. The graph clearly shows that the circularity of the Nuclei within lymphocytes is noticeably different from the circularity of the neutrophils, monocytes, and eosinophils, thereby making Nucleus Shape an identifying feature that can be used to distinguish lymphocytes. The above described technique for determining the circularity of the Nucleus is an example of an acceptable technique and provided for enablement purposes, and the present invention is not limited to this particular technique.

Figure 21:
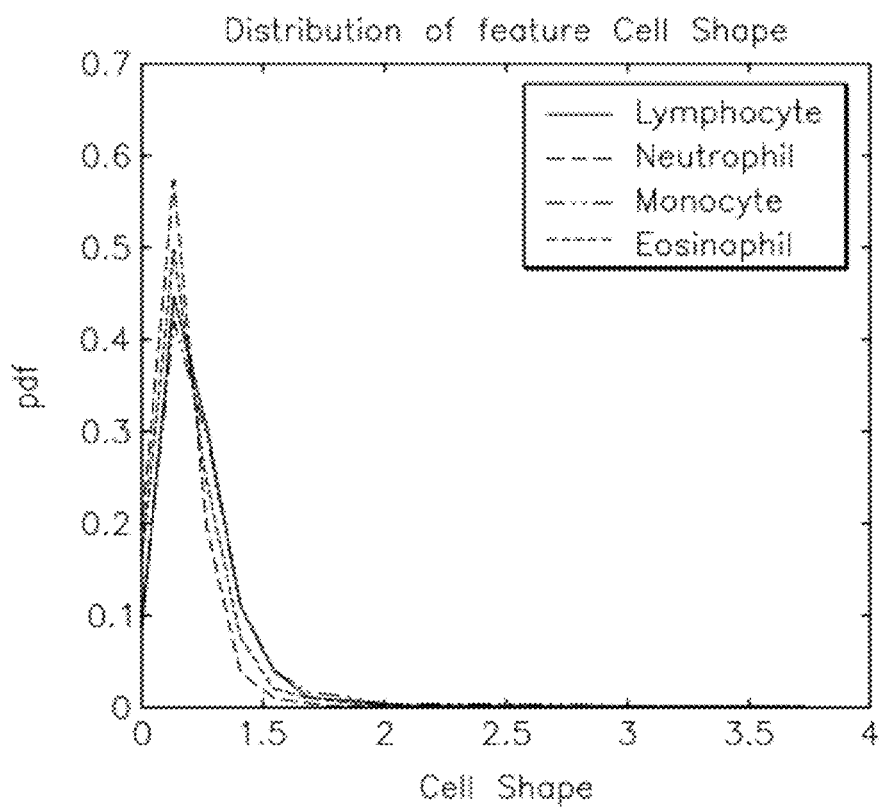
FIG. 21 is a graph depicting empirical data (in the form of a pdf) collected from a training set for each of lymphocytes, neutrophils, eosinophils, and monocytes, versus the Cell Shape for each of the aforesaid WBCs.

"Cell Shape" is an identifying feature that evaluates the shape of the boundary of a Cell; i.e., the distribution of the boundary pixels of a cell within the 2-D plane of the image. The techniques described above for determining the circularity of the Nucleus can be used to determine the Cell Shape. With respect to the Cell Shape, the techniques are preferably used to determine the deviation of a Cell from a shape such as an ellipse that is a closer approximation of a naturally occurring Cell Shape. The present invention is not limited to the above described techniques, or to using an elliptical shape as an approximation. FIG. 21 graphically illustrates the differences in Cell Shape associated with lymphocytes neutrophils, monocytes, and eosinophils. The Cell Shape associated with neutrophils, for example, makes Cell Shape an identifying feature that can be used to distinguish neutrophils.

"Nucleus Brightness" is an identifying feature that quantifies the mean fluorescent green intensity values within a Nucleus. FIGS. 6A-6C show that the Nucleus of a lymphocyte, neutrophil, and eosinophil have a greater intensity (i.e., appear brighter) than the Nucleus of a monocyte (FIG. 6D). The aforesaid difference in intensity is due to the relative dense distribution of chromatin inside the lymphocyte, neutrophil, and eosinophil Nuclei, versus the sparse distribution of chromatin inside the monocyte Nucleus. In some embodiments of the present invention, the Nucleus Brightness is determined relative to a normalized value of the mean fluorescent green intensity values within a Nucleus. The normalized value helps to account for variabilities within the sample; e.g., non-uniform staining within the sample. The exact technique used to normalize the intensity values can vary to suit the application at hand, and the present invention is not limited to any particular normalization technique. For example, in some instances the intensity values of mean fluorescent green intensity values within a Nucleus can be normalized relative to intensity values of neighboring Cells, or relative to Cells throughout the sample.

"Cytoplasm Brightness" is an identifying feature that quantifies the mean fluorescent red intensity values within cytoplasm. FIGS. 5A-5D show the intensity of the fluorescent red emission from the cytoplasm region of certain Cells. The intensity of red light emitted from the cytoplasm of a lymphocyte is low relative to the intensity of red light emitted from cytoplasm of a monocyte. The intensity of red light emitted from the cytoplasm of a monocyte is, in turn, low relative to the intensity of red light emitted from cytoplasm of neutrophils and eosinophils. As indicated above, in some embodiments of the present invention brightness values are determined relative to a normalized value; e.g., a normalized mean fluorescent red intensity value within a Cell. The exact technique used to normalize the intensity values can vary to suit the application at hand, and the present invention is not limited to any particular normalization technique.

Figure 22:
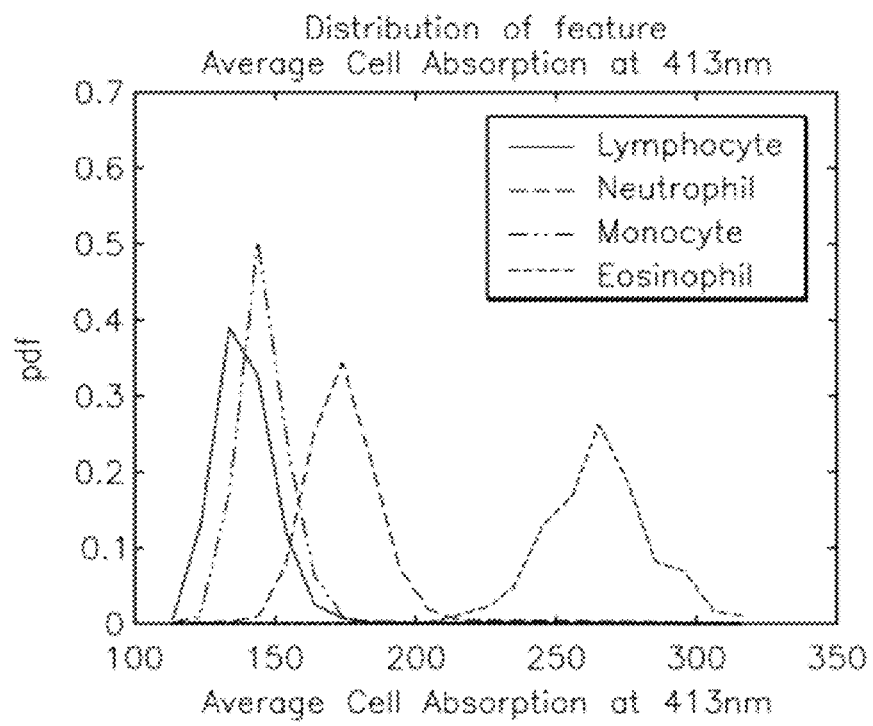
FIG. 22 is a graph depicting empirical data (in the form of a pdf) collected from a training set for each of lymphocytes, neutrophils, eosinophils, and monocytes, versus the Average Cell Absorption at 413 nm for each of the aforesaid WBCs.

"Average Cell Absorption at A Given Wavelength" is an identifying feature that quantifies the average OD of a Cell associated with blue light at a given wavelength (e.g., the "mean blue OD intensity") transmitted through the Cell. As indicated above, the transmitted blue light can be in the range of about 405-425 nm, and transmitted blue light at about 413 nm is advantageous because at or about 413 nm is where hemoglobin has peak absorption. To quantify the mean blue OD intensity of a Cell, blue light at a wavelength of about 413 nm is transmitted through the respective Cell. The OD associated with the blue light is determined on a per pixel basis. FIGS. 8A-8D each depict masked versions of the respective Cells, where everything is masked except those pixels having fluorescent red or green intensity values greater than a predetermined threshold. The mean value of the OD (i.e., the OD associated with the 413 nm wavelength) within the masked portion of the respective Cell is determined. FIGS. 7A-7D show images of blue OD resulting from the aforesaid light being transmitted through the respective Cell. To facilitate the evaluation of FIGS. 7A-7D, an encircling line is drawn in each image indicating a boundary between the outer region and the inner region where the average cell absorption is determined. FIG. 22 graphically illustrates the differences in the Average Cell Absorption at 413 nm associated with lymphocytes, neutrophils, monocytes, and eosinophils. The Average Cell Absorption at 413 nm associated with eosinophils, for example, makes Average Cell Absorption at 413 nm an identifying feature that can be used to distinguish eosinophils, which is also evident from FIGS. 7A-7D.

Figure 23:
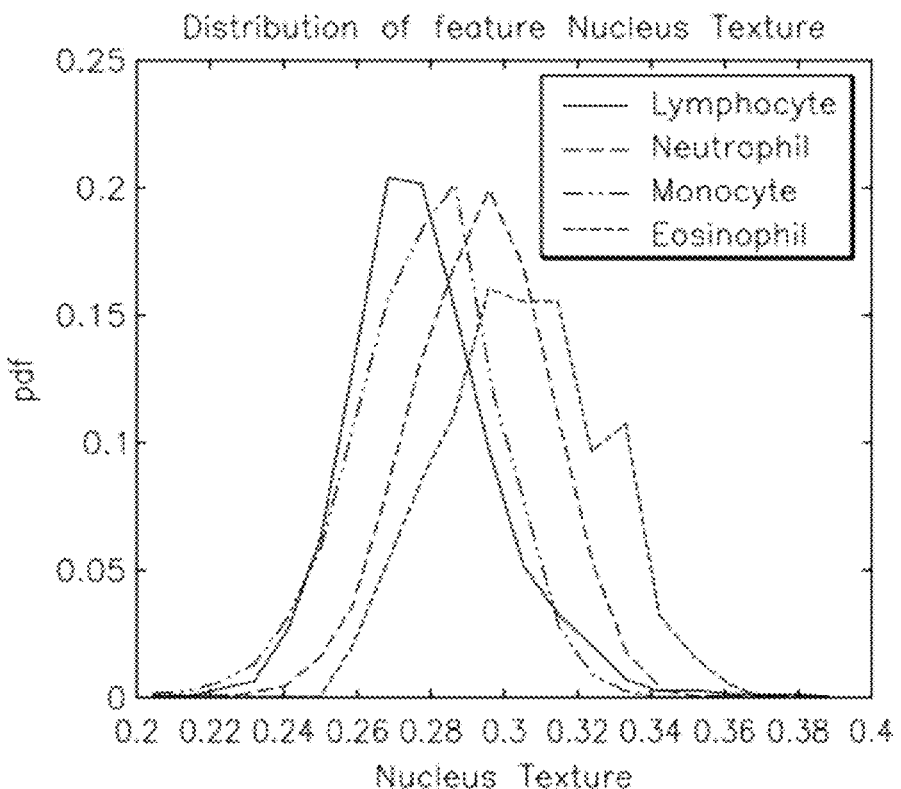
FIG. 23 is a graph depicting empirical data (in the form of a pdf) collected from a training set for each of lymphocytes, neutrophils, eosinophils, and monocytes, versus the Nucleus Texture for each of the aforesaid WBCs.

"Nucleus Texture" is an identifying feature that quantifies the "texture" of the fluorescent green light emitted within the Nucleus region of a Cell. The term "texture" is used to refer to the variability of the fluorescent green light within the Nucleus of a Cell, typically on a per pixel basis. Several different techniques can be used to quantify the Nucleus Texture. For example, the standard deviation of the normalized green intensity values per pixel can be used to quantify the Nucleus Texture. Normalized fluorescent green intensity values can be determined by identifying all of the pixels within a Cell that emit fluorescent green light, and assigning an arbitrary value of zero to the pixels with the lowest intensity and a value of one to the pixels of the highest intensity. The standard deviation of the intensity values can be computed from those values using known techniques. FIG. 23 graphically illustrates the differences in the Nucleus Texture associated with lymphocytes, neutrophils, monocytes, and eosinophils. The Nucleus Texture associated with lymphocytes, for example, make Nucleus Texture an identifying feature that can be used to distinguish lymphocytes.

Figure 24A:
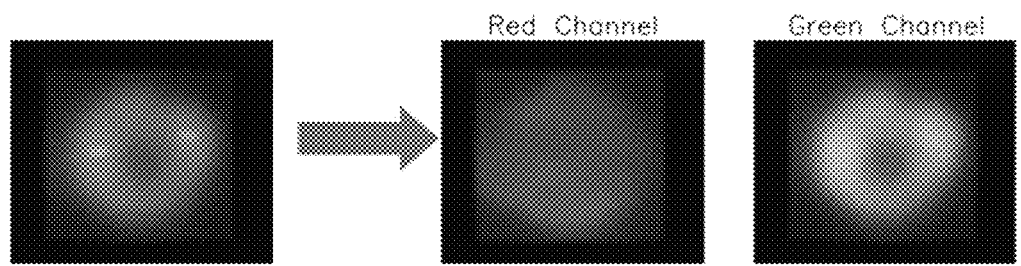
FIGS. 24A and 24B are images illustrating the differences between the intensity of a group of pixels disposed within an inner part of a Cell and the intensity of a group of pixels disposed within an outer part of a Cell, for both the red and green fluorescent images.
Figure 24B:
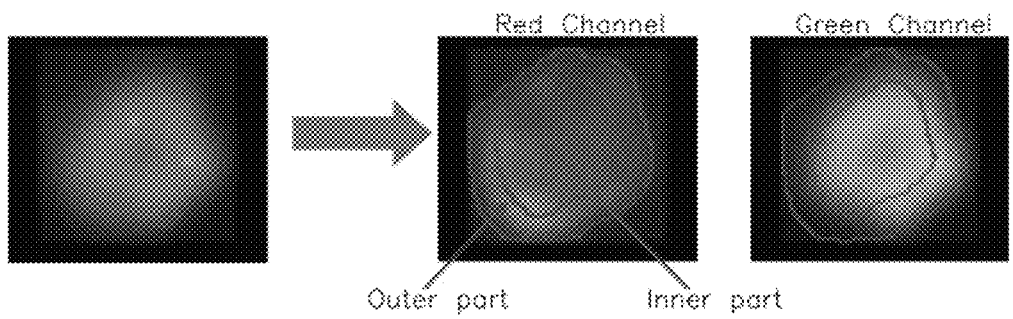
Figure 25:
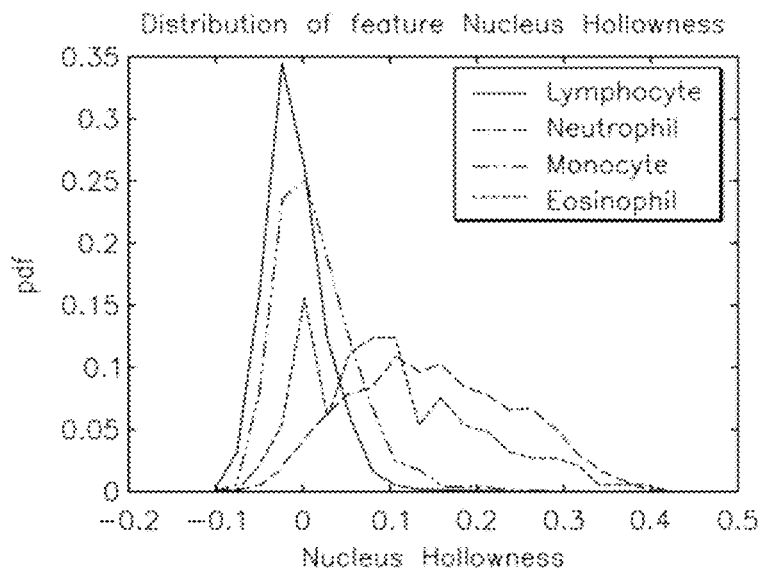
FIG. 25 is a graph depicting empirical data (in the form of a pdf) collected from a training set for each of lymphocytes, neutrophils, eosinophils, and monocytes, versus the Nucleus Hollowness for each of the aforesaid WBCs.

"Nucleus Hollowness" is an identifying feature that can be used in addition to, or in place of Nucleus Texture. Nucleus Hollowness is a ratio of the intensity of a group of pixels disposed within the inner part of a Cell versus the intensity of a group of pixels disposed on the outer part of the Cell in the fluorescent green image. The definition of what is the "outer part" and what is the "inner part" can be varied to suit the application at hand; e.g., based on empirical data. For example, the outer part can be defined as a band of a few pixels located at the boundary of the Cell; e.g., a band of three pixels at the boundary of the Cell when the pixel size is around 0.5 um. The inner part would then be that area within the Cell other than the outer part. FIG. 24A includes the cell nucleus in the green channel to illustrate the differences in intensity between inner part and outer part of a Nucleus. FIG. 24B contains similar images, and includes encircling lines to facilitate the identification of the inner and outer parts. The relative intensities of the pixels of inner and outer groups are such that the intensity of the inner pixels is typically quantifiably less than that of the outer pixels in some of the Neutrophils. FIGS. 24A and 24B show green channel and red channel images, where 24A shows a dim part in the Nucleus which appears like a hole. FIG. 25 graphically illustrates the differences in the "Nucleus Hollowness" associated with lymphocytes, neutrophils, monocytes, and eosinophils. The "Nucleus Hollowness" associated with Neutrophils, for example, has larger values than other types of cells and makes it an identifying feature that can be used to distinguish Neutrophils.

Figure 26:
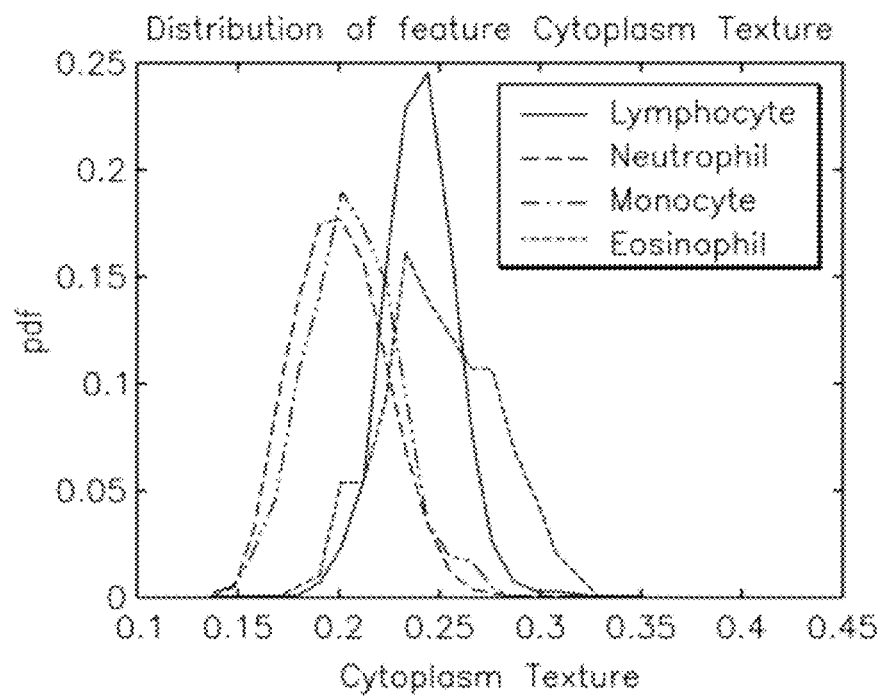
FIG. 26 is a graph depicting empirical data (in the form of a pdf) collected from a training set for each of lymphocytes, neutrophils, eosinophils, and monocytes, versus the Cytoplasm Texture for each of the aforesaid WBCs.

"Cytoplasm Texture" is an identifying feature that quantifies the "texture" of the fluorescent red light emitted within the cytoplasm of a Cell. The term "texture" is used to refer to the variability of the fluorescent red light within the cytoplasm of a Cell, typically on a per pixel basis. Several different techniques can be used to quantify the Cytoplasm Texture. For example, the standard deviation of the normalized red intensity value per pixel can be used to quantify the Cytoplasm Texture. Normalized fluorescent red intensity values can be determined by identifying all of the pixels within a Cell that emit fluorescent red light, and assigning an arbitrary value of zero to the pixels with the lowest intensity and a value of one to the pixels of the highest intensity. The standard deviation of the intensity values can be computed from those values using known techniques. FIG. 26 graphically illustrates the differences in the Cytoplasm Texture associated with lymphocytes, neutrophils, monocytes, and eosinophils. The Cytoplasm Texture associated with neutrophils, for example, makes Nucleus Texture an identifying feature that can be used to distinguish neutrophils.

Figure 27:
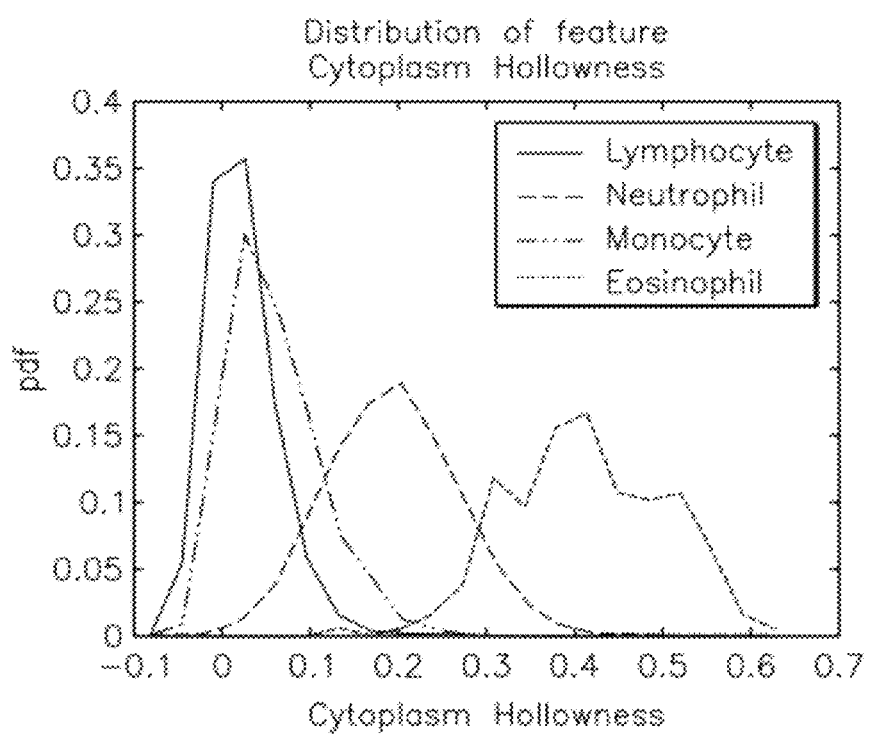
FIG. 27 is a graph depicting empirical data (in the form of a probability density function—pdf) collected from a training set for each of lymphocytes, neutrophils, eosinophils, and monocytes, versus the Cytoplasm Hollowness for each of the aforesaid WBCs.

In a manner similar to that described above vis-à-vis Nucleus Texture and Nucleus Hollowness, "Cytoplasm Hollowness" is an identifying feature that can be used in addition to, or in place of Cytoplasm Texture. Cytoplasm Hollowness is a ratio of the intensity of a group of pixels disposed within the inner part of a cytoplasm versus the intensity of a group of pixels disposed on the outer part of the cytoplasm in the fluorescent red image. The relative intensities of the pixels of inner and outer groups are such that the intensity of the inner pixels is typically quantifiably less than that of the outer pixels in the Neutrophils and Eosinophils. FIG. 27 graphically illustrates the differences in the "Cytoplasm Hollowness" associated with lymphocytes, neutrophils, monocytes, and eosinophils. The "Cytoplasm Hollowness" associated with neutrophils, for example, is greater than that associated with lymphocytes and monocytes, but less than that associated with eosinophils, thus make it an identifying feature that can be used to distinguish neutrophils.

"Cell Absorption Texture at a Given Wavelength" is an identifying feature that quantifies the texture of the OD values of a Cell associated with blue light at a given wavelength transmitted through the Cell, which OD is sensed on a per pixel basis. As indicated above, the transmitted blue light can be in the range of about 405-425 nm, and transmitted blue light at about 413 nm is advantageous because at or about 413 nm is where hemoglobin has peak absorption. The "texture" refers to the variability of the OD within the Cell. Also as indicated above, several different techniques can be used to quantify the texture; e.g., the standard deviation of the OD values associated with blue light at 413 nm. FIG. 28 graphically illustrates the differences in the Cell Absorption Texture at 413 nm associated with lymphocytes, neutrophils, monocytes, and eosinophils. The Cell Absorption Texture at 413 nm associated with eosinophils, for example, makes Cell Absorption Texture at 413 nm an identifying feature that can be used to distinguish eosinophils.

As indicated above, the programmable analyzer 72 is adapted to utilize identifying features, such as those described above, within an algorithm to identify the particular WBCs within the image, and thereby perform the LDC. The quantitative information provided by the aforesaid features can be processed in a number of different ways to provide the information associated with an LDC.

In some embodiments, for example, the programmable analyzer 72 is adapted to include a rule based classifier that evaluates the sample image relative to one or more of the features and use such evaluation to classify Cells within the sample. Each feature is describable in terms of a quantitative value. Some or all of the Cells within the sample image are evaluated in terms of a feature; i.e., a quantitative value for that feature is determined. The determined quantitative value is then compared against a reference value for that feature for the purpose of determining whether or not that Cell is a particular type of WBC. The process is followed for each type of feature under consideration. To evaluate a particular Cell image, for example, the classifier may first consider the Cell Area feature. If the determined Cell Area value is below a predetermined cell value area, the rule applied by the classifier would specify that certain WBC types (e.g., monocytes) are excluded and others are still included (e.g., eosinophils, lymphocytes, neutrophils) Next, the rule based classifier may evaluate the Cell image to determine the number of Lobes. If the determined number of Lobes is equal to or greater than a predetermined value (e.g., two), then the rule applied by the classifier would specify that certain WBC types (e.g., lymphocytes) are excluded and others are still included (e.g., eosinophils and neutrophils). Next, the rule based classifier may evaluate the Cell image to determine a quantitative value for the Average Cell Absorption at a Given Wavelength. If the determined Average Cell Absorption value at the Given Wavelength (e.g., at 413 nm) is greater than a predetermined threshold value, then the rule applied by the classifier would specify that certain WBC types (e.g., neutrophils) are excluded and others are still included (e.g., eosinophils). Thus, by applying certain evaluative rules to the Cell image, the rule based classifier makes a determination as to the WBC type; i.e., eosinophils.

The order in which the features are used to evaluate the sample image can be varied to suit the application at hand. For example, the programmable analyzer 72 can be adapted to first evaluate the sample image to determine the presence of Cells during an LDC analysis. Once Cells are identified, the remainder of the sample image can be masked and the LDC algorithm applied to only those sample image portions identified as Cells. The present invention is not limited to this sequencing example, however.

The quantitative value of each identifying feature for a type of WBC will likely quantitatively vary, to some degree, within a sample population from a particular subject, and may also vary between subjects. The LDC algorithm addresses this variability by, for example, utilizing a plurality of features to evaluate a Cell image. By using more than one feature to evaluate and identify a Cell, the present method decreases the potential for any particular feature to have an adverse effect on the accuracy of the evaluation. The table provided in FIG. 29 illustrates groups of dominant distinguishing features associated with particular types of WBCs. These feature groupings are examples of groups that can be used to significantly distinguish one WBC from another WBC within the four-part LDC. The variability can also be addressed by selectively adjusting the magnitude of the quantitative reference value(s) associated with each feature.

Figure 30:
FIG. 30 is an image of a whole blood sample with one or more colorants added, including WBCs and RBCs.
Figure 31:
FIG. 31 is the whole blood sample image shown in FIG. 30, with the WBCs boxed.
Figure 32:
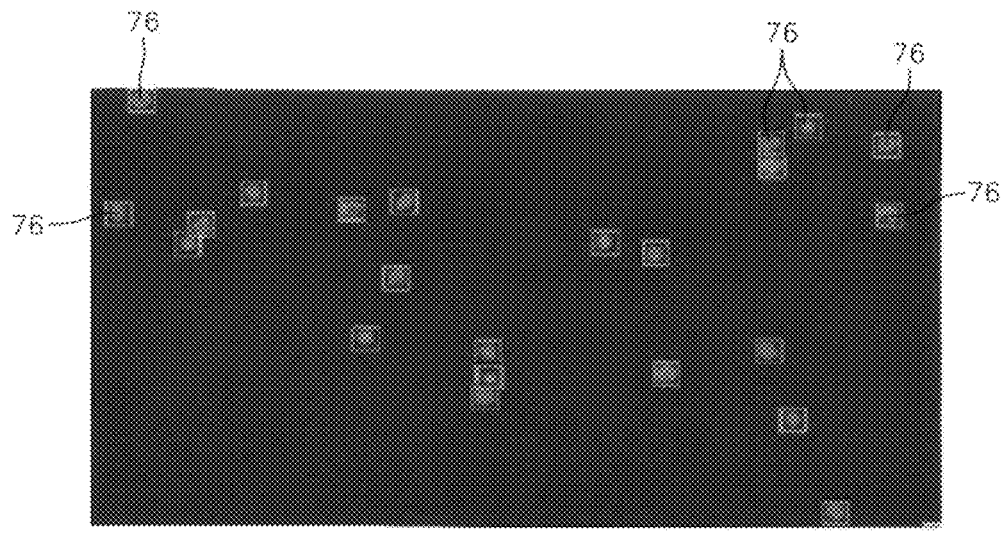
FIG. 32 is whole blood sample image shown in FIG. 30 with the WBCs boxed and the remainder of the image outside the boxes removed.
Figure 33:
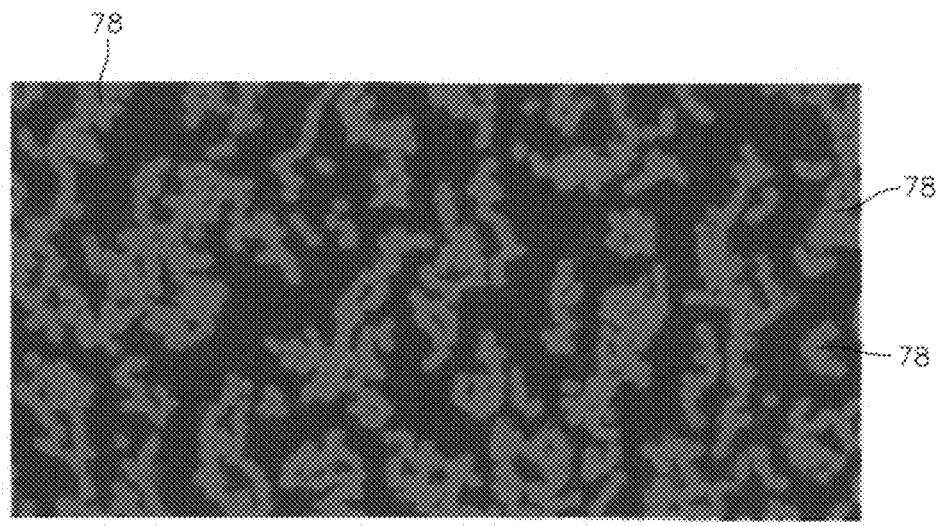
FIG. 33 is whole blood sample image shown in FIG. 30 with the boxed WBCs removed and the remainder of the image outside the boxes shown.

In some embodiments, the programmable analyzer 72 is adapted to define a perimeter (i.e., a "box") around a group of pixels identified as being a type of WBC (although the specific type of WBC may not yet be known, depending on when the box is defined). To illustrate, FIG. 30 shows a sample image having a plurality of WBCs 76 disposed in and amongst a large number of RBCs 78. FIG. 31 shows the sample image of FIG. 30 with boxes applied to each of the WBCs 76 identified within the sample image. Depending upon the analysis at hand, each WBC 76 can be boxed, or alternatively certain types of WBCs can be boxed. Each box defines an image subset associated with a particular WBC 76, which image subset would include the WBC pixels and the additional pixels, if any, that fill the remainder of the box. In some embodiments, a standard size box may be used to create an image subset for each of the WBCs identified within the sample. For example, after all of the WBCs 76 are identified and the largest size WBC is determined within the identified WBCs, a "box" size large enough to include all of the pixels representing the largest WBC can be selected; e.g., a square box that is thirty (30) pixels by thirty (30) pixels. Because the size of WBCs may vary, however, the size of a "standard" box may vary from analysis to analysis and is not limited to any particular size. Once an appropriate standard box size is chosen, the same size box can then be used to define an image subset for each WBC 76. The image subset boxes (standard or individually sized) can be used as the basis for distinguishing the WBCs 76 within the sample image; e.g., the portion of the image outside the boxes can be masked, leaving only the "boxed" WBCs (e.g., see FIG. 32), or conversely the portion of the image inside the boxes can be masked, leaving only the remaining image (e.g., see FIG. 33).

The image subset boxes can be used to facilitate evaluation of the WBCs 76. For example, the programmable analyzer 72 can be adapted to assign colors to the perimeters of the image subset boxes in a manner that identifies the type of WBC enclosed within the box (e.g., see FIG. 31; e.g., monocytes=blue box perimeter; eosinophils=orange box perimeter; lymphocytes=green box perimeter; and neutrophils=red box perimeter) to facilitate their evaluation. The aforesaid box perimeter colors are arbitrarily chosen and the invention is not limited thereto. In alternative embodiments, visual features other than colors can be used distinguish the types of WBCs 76 contained within the boxes.

Figure 34:
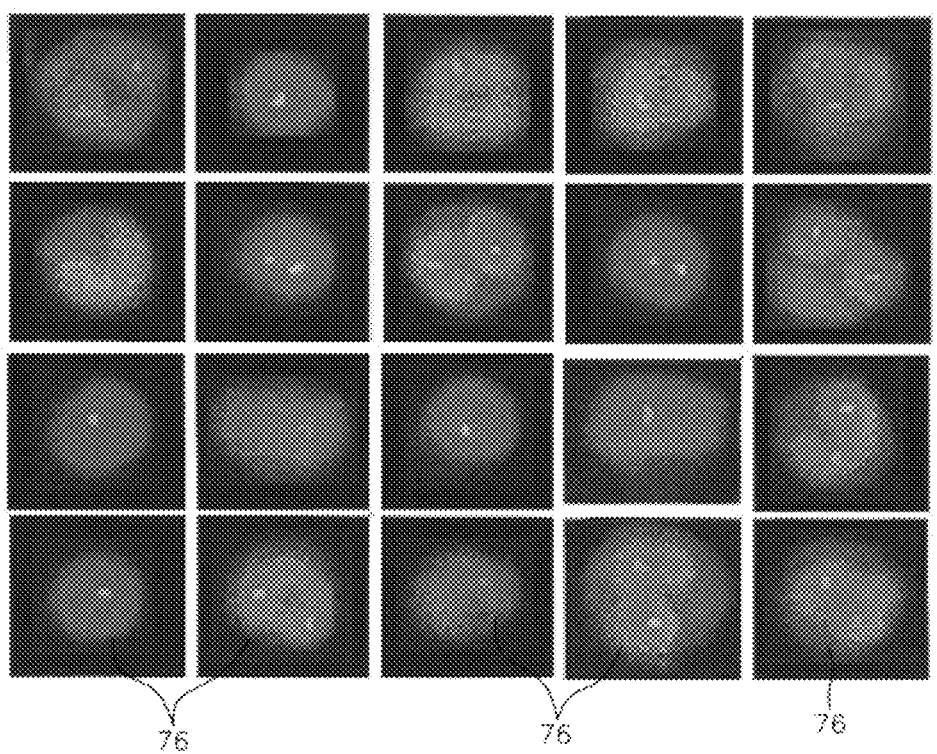
FIG. 34 is a collective view of sample image portions representing WBCs shown in a collective view.

In some embodiments, the programmable analyzer 72 is adapted to assemble some or all of the image portions of the identified WBCs (or image subset boxes containing WBCs) in a collective display format that allows the WBCs to be comparatively viewed on the analysis device display 74. For example, FIG. 34 illustrates a collective comparative display wherein the identified WBCs 76 are arranged in close proximity to facilitate analysis. In some embodiments, the assembled WBCs 76 may be separated and viewed by type; e.g., all of the WBCs 76 in the comparative view are eosinophils, or neutrophils, etc. Alternatively, portions of the comparative view may be dedicated to particular WBC types; e.g., the view includes a row of eosinophils, a row of neutrophils, etc.

In some embodiments, the programmable analyzer 72 is also adapted to associate each identified WBC 76 with its particular location within the sample image (or within the frame of the image), and the specific type of that WBC (e.g., lymphocyte, neutrophil, monocyte, eosinophil, basophil). The associated locations enable the WBC image subsets to be reassembled in the locations where they appeared in the original sample image relative to one another. The relative positioning also enables analysis regarding the influence of adjacent WBCs and/or location within the sample image. For example, colorants added to the sample will sometimes not uniformly distribute within the quiescent sample. A region of the sample may have a uniform colorant distribution, but the concentration of the colorant within that region may be different than the concentration in a different region. Consequently, analyses that utilize colorant concentration may be skewed if WBCs from different regions are compared on a colorant concentration basis. The programmable analyzer 72 is adapted to consider where the WBC image portions are located relative to the analysis at hand. Differences in colorant concentration illustrate the utility of knowing the locations of the WBC sample image portions, but the utility is not limited thereto.

There is considerable utility in storing the portions of the sample image relied upon in the analysis in a format that enables the stored information to be reproduced in relatively high definition; i.e., in a manner that has an acceptably low level of information loss that does not negatively affect the ability to subsequently analyze the information represented on a per pixel basis. Color images of a blood sample quiescently residing within a chamber 50 can, however, be substantial in size (e.g., 1-2 GB). Large image data files can consume storage space, impede transfer to a remote location, and/or slow processing. To address problems associated with large image data files, the programmable analyzer 72 is further adapted to process the image in a manner that facilitates data compression.

To facilitate compression of the sample image, the programmable analyzer 72 is adapted to compress the sample image portions determined to represent a WBC. A compression algorithm is used that enables the sample image portions to be compressed and subsequently decompressed with little or no information loss relative to the original pixels of the relevant sample image portion; i.e., to the extent that there is any information loss, such loss does not impede analysis of the information represented within the sample image portion. A lossless data compression algorithm, for example, can be used to compress the sample image portions. In those instances where the WBCs are contained within image subset boxes, all of the pixels within each image subset box are compressed using a lossless compression algorithm or the like. An example of an acceptable lossless compression algorithm is JPEG 2000 lossless mode offered by the Joint Photographic Experts Group. The present invention is not limited to using a lossless compression type algorithm, or any particular type of lossless compression algorithm.

In terms of the above described LDC analysis, the programmable analyzer 72 can be adapted to compress WBC pixel data before the complete analysis is performed; e.g., after the Cells are identified, but before the analysis determines the type of WBC. Preferably, however, the programmable analyzer 72 is adapted to compress WBC pixel data after the analysis is performed and analysis data (e.g., WBC type) can be provided with the sample.

The remaining portion of the image can be either compressed using a less precise compression technique that compresses image data to a greater degree than is possible using a lossless compression technique or the remaining portion can be discarded. In those instances where the remaining portion of the image is compressed, a lossy data compression algorithm, for example, can be used to compress the remaining image portion. An example of an acceptable lossy compression algorithm is JPEG 2000 lossy mode offered by the Joint Photographic Experts Group. The present invention is not limited to using a lossy compression type algorithm, or any particular type of lossy compression algorithm.

As indicated above, the programmable analyzer 72 may be adapted to associate each identified WBC with its particular location within the sample image (or within the image frame). The associated locations enable the WBC image subsets to be reassembled post-compression in the locations where they appeared in the original sample image relative to one another.

In the operation of the invention, an undiluted sample of whole blood is collected into a disposable cartridge such as that illustrated in FIG. 2. Reagents, including one or more colorants (e.g., ACO) and an anticoagulant (e.g., EDTA), are added to the sample to facilitate the LDC analysis. The sample admixed with the reagents is deposited within the analysis chamber 50 portion of the cartridge, where it quiescently resides during the imaging process. The cartridge is inserted into (or otherwise engaged with) the analysis device, where it is appropriately positioned by the cartridge positioning device 66 relative to the objective lens 64, sample illuminator 68, and image dissector 70, and is subsequently imaged.

In most instances, the analysis device is programmed to image the entirety of the sample quiescently residing within the chamber 50 (in a single image or in frames of the entire image). In some applications, however, a portion of the sample can be imaged. The imaging process can vary depending upon the application at hand. For the four-part LDC described above, the imaging process involves subjecting the sample to a fluorescent excitation light source (e.g., light at about 470 nm from the epi-fluorescent light source), and to a transmission light source (e.g., blue light at or about 413 nm). The excitation light source causes the colorant combined with elements disposed within the sample to emit fluorescent light at two different wavelengths (e.g., red~660 nm, and green~540 nm). Some amount of the transmitted light passes through the sample, and the remainder is absorbed by the sample/colorant. The image dissector 70 captures the light transmitted through the sample and fluorescing from the sample and provides signals representative of the intensity and color of the captured light. The signals are processed into a form that permits the programmable analyzer 72 to form an image of the sample based on the signals, which image can be quantitatively analyzed to perform the four-part LDC.

During the quantitative analysis of the sample image, the algorithm identifies WBCs within the image. To facilitate and/or expedite the analysis, the sample image can be masked (e.g., by segmentation) to eliminate all the sample image except those portions identified as a Cell. The image portions identified as Cells are then quantitatively evaluated in teens of one or more of the features (e.g., see feature groupings disclosed in FIG. 29), and typically in terms of substantially all of the features. The quantitative values (or probability density functions) for each of the Cells for each of the features are then utilized within the algorithm (e.g., the learned model portion) to classify the Cells. Once the Cells are classified and enumerated, the data is organized to provide the LDC data. The classified Cells can subsequently be viewed by the user on the display 74 connected to the analysis device.

To facilitate storing and/or sending the image analysis data, the image is processed using a compression algorithm in the manner described above. For example, the image subsets associated with the Cells (e.g., identified WBCs) are processed using a lossless type compression algorithm and the remaining portion of the image is compressed using a lossy data compression algorithm, or is discarded.

The ability of the present invention to compress the sample image provides significant advantages relating to the processing and storing of the file. For example, in a typical sample image about 1000 WBCs can be identified and differentiated in a given analysis. If the sample image is divided into ten (10) frames each sized about twenty-five hundred by nineteen hundred pixels (2500×1900). If each identified WBC is enclosed within a thirty by thirty (30×30) pixel box, the pre-compression ratio is ((2500×1900×10)/(30×30×1000)) about 52.8 times. If a lossless compression algorithm that compresses image data by four times is subsequently applied to the image data subsets within the WBC boxes, and the remaining image portion is discarded, the compression ratio between the original image and the compressed image data is greater than two-hundred times (>200×). Even at this significant compression ratio, the compressed data can be recalled with an inconsequential amount of information loss. Image analysis data stored in the above-described method greatly facilitates subsequent retrieval and/or transfer to a remote location. The retrieved image analysis data, which was previously analyzed pursuant to the automated algorithm, can be reviewed by a skilled technician and the analysis results confirmed; e.g., for quality control purposes. In addition, the high-resolution retrieved data can be subjected to additional image analyses as desired.

Although this invention has been shown and described with respect to the detailed embodiments thereof, it will be understood by those skilled in the art that various changes in form and detail thereof may be made without departing from the spirit and the scope of the invention.

What is claimed is:

1. A method for analyzing white blood cells (WBCs) within a whole blood sample quiescently residing within a chamber while the sample is analyzed, which chamber is defined by at least one transparent panel, and which whole blood sample includes at least one colorant operable to differentially identify at least one WBC type from another WBC type within the sample, the method comprising the steps of:

creating at least one image of the sample quiescently residing within the chamber;

identifying portions of the sample image, with each portion representing a single WBC;

compressing the sample image portions using a first compression algorithm, which first compression algorithm is a lossless compression algorithm;

one of compressing a remainder of the sample image not included in the portions using a second compression algorithm, which second compression algorithm is a lossy compression algorithm, or discarding the remainder;

quantitatively analyzing the sample image portions relative to one or more predetermined quantitatively determinable features;

identifying the type of WBC in each portion using the quantitatively determinable features;

defining a perimeter around each sample image portion representing a WBC, wherein each perimeter is a particular shape and all of the perimeters are the same size; and making the perimeters visible within a display of the sample image.

2. The method of claim 1, further comprising the step of associating the identified type of WBC with the respective compressed sample image portion representing the WBC.

3. The method of claim 1, further comprising the step of associating a location of the sample image portion within the sample image with the respective compressed sample image portion.

4. The method of claim 3, further comprising the steps of:
   decompressing the sample image portions; and
   positioning each sample image portion relative to the other sample image portions using each sample image portion's respective location within the displayed image.

5. The method of claim 1 further comprising the step of selecting a standard perimeter shape size large enough to include the sample image portion representing a largest WBC of all the WBCs represented within the sample image portions, and defining the perimeters around each of the sample image portions with the standard perimeter shape.

6. The method of claim 1, wherein the perimeter around the sample image portion of each type of WBC indicates the type of WBC and distinguishes that type of WBC from the other types of WBCs within the sample image.

7. The method of claim 1, further comprising the step of displaying a plurality of the sample image portions representing WBCs in a collective view.

8. The method of claim 7, wherein the step of displaying a plurality of the sample image portions representing WBCs in a collective view includes displaying a plurality of sample image portions representing only a single type of WBC.

9. The method of claim 7, wherein the step of displaying a plurality of the sample image portions representing WBCs in a collective view includes arranging sample image portions representing a particular type of WBC together within the collective view.

10. A method for imaging white blood cells (WBCs) within a whole blood sample quiescently residing within a chamber defined by at least one transparent panel, the method comprising the steps of:
    creating at least one image of the sample quiescently residing within the chamber;
    identifying portions of the sample image and a location of each portion within the sample image, with each portion representing a single WBC;
    compressing the sample image portions using a first compression algorithm, which first compression algorithm is a lossless compression algorithm; and
    one of compressing a remainder of the sample image not included in the portions using a second compression algorithm, which first compression algorithm is a lossy compression algorithm, or discarding the remainder;
    decompressing the sample image portions and collectively displaying the portions, with each portion relatively located based on its location within the sample image; and
    defining a perimeter around each sample image portion representing a WBC, wherein each perimeter is a particular shape and all of the perimeters are the same size; and
    making the perimeters visible within the sample image.

11. The method of claim 10, further comprising the step of associating a specific WBC type with the WBC represented in each sample image portion.

12. The method of claim 10, wherein the perimeter around the sample image portion of each type of WBC indicates the type of WBC and distinguishes that type of WBC from the other types of WBCs within the sample image.

13. The method of claim 10, further comprising the step of displaying a plurality of the sample image portions representing WBCs in a collective view.

14. An apparatus for analyzing a whole blood sample quiescently residing within a chamber, comprising:
    an objective lens;
    a sample illuminator operable to provide a fluorescent excitation light and one or more transmission lights;
    an image sensor adapted to receive one or both of light fluorescing from the sample and light transmitted through the sample, and produce signals representative of such light; and
    a programmable analyzer adapted to receive the signals representative of the light and create at least one image of the sample quiescently residing within the chamber, and further adapted to quantitatively analyze the sample image and identify portions of the sample image, each portion representing a single white blood cell (WBC) within the image, and further adapted to selectively compress the sample image portions using a first compression algorithm, which first compression algorithm is a lossless compression algorithm, and either compress a remainder of the sample image not included in the portions using a second compression algorithm, which first compression algorithm is a lossy compression algorithm, or discard the remainder, wherein the programmable analyzer is further adapted to quantitatively analyze the sample image portions relative to one or more predetermined quantitatively determinable features, and identify the type of WBC in each portion using the quantitatively determinable features, and wherein the programmable analyzer is further adapted to define a perimeter around each sample image portion representing a WBC, wherein each perimeter is a particular shape and all of the perimeters are the same size, and wherein the programmable analyzer is further adapted to make the perimeters visible within the sample image.

15. The apparatus of claim 14, wherein the programmable analyzer is further adapted to associate the identified type of WBC with the respective compressed sample image portion representing the WBC.

16. The apparatus of claim 14, wherein the programmable analyzer is further adapted to associate a location of each sample image portion within the sample image with the respective compressed sample image portion in a manner that permits the each sample image portion to be decompressed and positioned within a display relative to the other sample image portions using each sample image portion's respective location within sample image.

17. The apparatus of claim 14 wherein the programmable analyzer is further adapted to select a standard perimeter shape size large enough to include the sample image portion representing a largest WBC of all the WBCs represented within the sample image portions, and to define the perimeters around each of the sample image portions with the standard perimeter shape.

18. The apparatus of claim 14, wherein the programmable analyzer is further adapted to define a perimeter around the sample image portion of each type of WBC that indicates the type of WBC and distinguishes that type of WBC from the other types of WBCs within the sample image.

19. The apparatus of claim 14, wherein the programmable analyzer is further adapted to display a plurality of the sample image portions representing WBCs in a collective view.

* * * * *